United States Patent
Mathkar et al.

(10) Patent No.: US 10,473,447 B2
(45) Date of Patent: Nov. 12, 2019

(54) MAGNETIC FREQUENCY SELECTION FOR ELECTROMAGNETIC POSITION TRACKING

(71) Applicant: Lincoln Global, Inc., Santa Fe Springs, CA (US)

(72) Inventors: Suyash Mathkar, Mayfield Heights, OH (US); Sarah Evans, Garrettsville, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 27 days.

(21) Appl. No.: 15/798,468

(22) Filed: Oct. 31, 2017

(65) Prior Publication Data

US 2018/0128589 A1    May 10, 2018

Related U.S. Application Data

(60) Provisional application No. 62/417,513, filed on Nov. 4, 2016.

(51) Int. Cl.
| | |
|---|---|
| *B23K 37/00* | (2006.01) |
| *G01B 7/00* | (2006.01) |
| *B23K 9/095* | (2006.01) |
| *B23K 9/127* | (2006.01) |
| *G09B 19/24* | (2006.01) |

(52) U.S. Cl.
CPC ............ *G01B 7/003* (2013.01); *B23K 9/0956* (2013.01); *B23K 9/1276* (2013.01); *B23K 37/00* (2013.01); *G09B 19/24* (2013.01)

(58) Field of Classification Search
CPC ......... G01B 7/003; B23K 37/00; G09B 19/24
See application file for complete search history.

(56) References Cited

U.S. PATENT DOCUMENTS

| | | |
|---|---|---|
| 317,063 A | 5/1885 | Wittenstrom |
| 428,459 A | 5/1890 | Coffin |
| 483,428 A | 9/1892 | Coffin |
| 1,159,119 A | 11/1915 | Springer |
| 1,286,529 A | 12/1918 | Cave |

(Continued)

FOREIGN PATENT DOCUMENTS

| | | |
|---|---|---|
| CA | 2698078 A1 | 9/2011 |
| CN | 1665633 A | 9/2005 |

(Continued)

OTHER PUBLICATIONS

Adams et. al., "Adaptively Sampled Particle Fluids," ACM Transactions on Graphics, vol. 26, No. 3, Article 48, Jul. 2007, pp. 48.1-48.7.

(Continued)

*Primary Examiner* — Kiley S Stoner
(74) *Attorney, Agent, or Firm* — Calfee, Halter & Griswold LLP

(57) ABSTRACT

A system for and method of tracking elements of a welding system using electromagnetic sensors and an electromagnetic transmitter, the electromagnetic sensors and an electromagnetic transmitter operating at a frequency group that is selected to reduce or avoid interference from other welding systems, such selection being performed manually by a user or automatically as the result of detection of interference at the sensors.

12 Claims, 11 Drawing Sheets

(56) References Cited

U.S. PATENT DOCUMENTS

| | | |
|---|---|---|
| 2,326,944 A | 8/1943 | Holand et al. |
| 2,333,192 A | 11/1943 | Moberg |
| D140,630 S | 3/1945 | Garibay |
| D142,377 S | 9/1945 | Dunn |
| D152,049 S | 12/1948 | Welch |
| 2,681,969 A | 6/1954 | Burke |
| D174,208 S | 3/1955 | Abigaard |
| 2,728,838 A | 12/1955 | Barnes |
| D176,942 S | 2/1956 | Cross |
| 2,894,086 A | 7/1959 | Rizer |
| 3,035,155 A | 5/1962 | Hawk |
| 3,059,519 A | 10/1962 | Stanton |
| 3,356,823 A | 12/1967 | Waters et al. |
| 3,555,239 A | 1/1971 | Kerth |
| 3,562,927 A | 2/1971 | Moskowitz |
| 3,562,928 A | 2/1971 | Schmitt |
| 3,621,177 A | 11/1971 | McPherson et al. |
| 3,654,421 A | 4/1972 | Streetman et al. |
| 3,690,020 A | 9/1972 | McBratnie |
| 3,739,140 A | 6/1973 | Rotilio |
| 3,866,011 A | 2/1975 | Cole |
| 3,867,769 A | 2/1975 | Schow |
| 3,904,845 A | 9/1975 | Minkiewicz |
| 3,988,913 A | 11/1976 | Metcalfe et al. |
| D243,459 S | 2/1977 | Bliss |
| 4,024,371 A | 5/1977 | Drake |
| 4,041,615 A | 8/1977 | Whitehill |
| D247,421 S | 3/1978 | Driscoll |
| 4,124,944 A | 11/1978 | Blair |
| 4,132,014 A | 1/1979 | Schow |
| 4,153,913 A | 5/1979 | Swift |
| 4,237,365 A | 12/1980 | Lambros et al. |
| 4,280,041 A | 7/1981 | Kiessling et al. |
| 4,280,137 A | 7/1981 | Ashida et al. |
| 4,314,125 A | 2/1982 | Nakamura |
| 4,328,416 A * | 5/1982 | Dudley ............... B23K 9/1274 250/202 |
| 4,354,087 A | 10/1982 | Osterlitz |
| 4,359,622 A | 11/1982 | Dostoomian et al. |
| 4,375,026 A | 2/1983 | Kearney |
| 4,410,787 A | 10/1983 | Kremers et al. |
| 4,429,266 A | 1/1984 | Tradt |
| 4,452,589 A | 6/1984 | Denison |
| D275,292 S | 8/1984 | Bouman |
| D277,761 S | 2/1985 | Korovin et al. |
| 4,525,619 A | 6/1985 | Ide et al. |
| D280,329 S | 8/1985 | Bouman |
| 4,555,614 A | 11/1985 | Morris et al. |
| 4,611,111 A | 9/1986 | Baheti et al. |
| 4,616,326 A | 10/1986 | Meier et al. |
| 4,629,860 A | 12/1986 | Lindbom |
| 4,677,277 A | 6/1987 | Cook et al. |
| 4,680,014 A | 7/1987 | Paton et al. |
| 4,689,021 A | 8/1987 | Vasiliev et al. |
| 4,707,582 A | 11/1987 | Beyer |
| 4,716,273 A | 12/1987 | Paton et al. |
| D297,704 S | 9/1988 | Bulow |
| 4,812,614 A | 3/1989 | Wang et al. |
| 4,867,685 A | 9/1989 | Brush et al. |
| 4,877,940 A | 10/1989 | Bangs et al. |
| 4,897,521 A | 1/1990 | Burr |
| 4,907,973 A | 3/1990 | Hon |
| 4,931,018 A | 6/1990 | Herbst et al. |
| 4,973,814 A | 11/1990 | Kojima et al. |
| 4,998,050 A | 3/1991 | Nishiyama et al. |
| 5,034,593 A | 7/1991 | Rice et al. |
| 5,061,841 A | 10/1991 | Richardson |
| 5,089,914 A | 2/1992 | Prescott |
| 5,192,845 A | 3/1993 | Kirmsse et al. |
| 5,206,472 A | 4/1993 | Myking et al. |
| 5,266,930 A | 11/1993 | Ichikawa et al. |
| 5,283,418 A | 2/1994 | Bellows et al. |
| 5,285,916 A | 2/1994 | Ross |
| 5,288,968 A | 2/1994 | Cecil |
| 5,305,183 A | 4/1994 | Teynor |
| 5,320,538 A | 6/1994 | Baum |
| 5,337,611 A | 8/1994 | Fleming et al. |
| 5,360,156 A | 11/1994 | Ishizaka et al. |
| 5,360,960 A | 11/1994 | Shirk |
| 5,362,962 A | 11/1994 | Barborak et al. |
| 5,370,071 A | 12/1994 | Ackermann |
| D359,296 S | 6/1995 | Witherspoon |
| 5,424,634 A | 6/1995 | Goldfarb et al. |
| 5,436,638 A | 7/1995 | Bolas et al. |
| 5,464,957 A | 11/1995 | Kidwell et al. |
| 5,465,037 A | 11/1995 | Huissoon et al. |
| D365,583 S | 12/1995 | Viken |
| 5,493,093 A | 2/1996 | Cecil |
| 5,533,206 A | 7/1996 | Petrie et al. |
| 5,547,052 A | 8/1996 | Latshaw |
| 5,562,843 A | 10/1996 | Yasumoto |
| 5,662,822 A | 9/1997 | Tada et al. |
| 5,670,071 A | 9/1997 | Ueyama et al. |
| 5,676,503 A | 10/1997 | Lang |
| 5,676,867 A | 10/1997 | Van Allen |
| 5,708,253 A | 1/1998 | Bloch et al. |
| 5,710,405 A | 1/1998 | Solomon et al. |
| 5,719,369 A | 2/1998 | White et al. |
| D392,534 S | 3/1998 | Degen et al. |
| 5,728,991 A | 3/1998 | Takada et al. |
| 5,734,421 A | 3/1998 | Maguire, Jr. |
| 5,751,258 A | 5/1998 | Fergason et al. |
| D395,296 S | 6/1998 | Kaye et al. |
| 5,774,110 A | 6/1998 | Edelson |
| D396,238 S | 7/1998 | Schmitt |
| 5,781,258 A | 7/1998 | Dabral et al. |
| 5,823,785 A | 10/1998 | Matherne |
| 5,835,077 A | 11/1998 | Dao et al. |
| 5,835,277 A | 11/1998 | Hegg |
| 5,845,053 A | 12/1998 | Watanabe et al. |
| 5,877,777 A | 3/1999 | Colwell |
| 5,949,388 A | 9/1999 | Atsumi et al. |
| 5,963,891 A | 10/1999 | Walker et al. |
| 6,008,470 A | 12/1999 | Zhang et al. |
| 6,037,948 A | 3/2000 | Liepa |
| 6,049,059 A | 4/2000 | Kim |
| 6,051,805 A | 4/2000 | Vaidya et al. |
| 6,114,645 A | 9/2000 | Burgess |
| 6,155,475 A | 12/2000 | Ekelof et al. |
| 6,155,928 A | 12/2000 | Burdick |
| 6,230,327 B1 | 5/2001 | Briand et al. |
| 6,236,013 B1 | 5/2001 | Delzenne |
| 6,236,017 B1 | 5/2001 | Smartt et al. |
| 6,242,711 B1 | 6/2001 | Cooper |
| 6,271,500 B1 | 8/2001 | Hirayama et al. |
| 6,301,763 B1 | 10/2001 | Pryor |
| 6,330,938 B1 | 12/2001 | Herve et al. |
| 6,330,966 B1 | 12/2001 | Eissfeller |
| 6,331,848 B1 | 12/2001 | Stove et al. |
| D456,428 S | 4/2002 | Aronson et al. |
| 6,373,465 B2 | 4/2002 | Jolly et al. |
| 6,377,011 B1 | 4/2002 | Ben-Ur |
| D456,828 S | 5/2002 | Aronson et al. |
| 6,396,232 B2 | 5/2002 | Haanpaa et al. |
| D461,383 S | 8/2002 | Blackburn |
| 6,427,352 B1 | 8/2002 | Pfeiffer et al. |
| 6,441,342 B1 | 8/2002 | Hsu |
| 6,445,964 B1 | 9/2002 | White et al. |
| 6,492,618 B1 | 12/2002 | Flood et al. |
| 6,506,997 B2 | 1/2003 | Matsuyama |
| 6,552,303 B1 | 4/2003 | Blankenship et al. |
| 6,560,029 B1 | 5/2003 | Dobbie et al. |
| 6,563,489 B1 | 5/2003 | Latypov et al. |
| 6,568,846 B1 | 5/2003 | Cote et al. |
| D475,726 S | 6/2003 | Suga et al. |
| 6,572,379 B1 | 6/2003 | Sears et al. |
| 6,583,386 B1 | 6/2003 | Ivkovich |
| 6,593,540 B1 | 7/2003 | Baker et al. |
| 6,621,049 B2 | 9/2003 | Suzuki |
| 6,624,388 B1 | 9/2003 | Blankenship et al. |
| D482,171 S | 11/2003 | Vui et al. |
| 6,647,288 B2 | 11/2003 | Madill et al. |
| 6,649,858 B2 | 11/2003 | Wakeman |
| 6,655,645 B1 | 12/2003 | Lu et al. |

(56) References Cited

U.S. PATENT DOCUMENTS

| | | |
|---|---|---|
| 6,660,965 B2 | 12/2003 | Simpson |
| 6,679,702 B1 | 1/2004 | Rau |
| 6,697,701 B2 | 2/2004 | Hillen et al. |
| 6,697,770 B1 | 2/2004 | Nagetgaal |
| 6,703,585 B2 | 3/2004 | Suzuki |
| 6,708,385 B1 | 3/2004 | Lemelson |
| 6,708,835 B1 | 3/2004 | Mathis |
| 6,710,298 B2 | 3/2004 | Eriksson |
| 6,710,299 B2 | 3/2004 | Blankenship et al. |
| 6,715,502 B1 | 4/2004 | Rome et al. |
| D490,347 S | 5/2004 | Meyers |
| 6,730,875 B2 | 5/2004 | Hsu |
| 6,734,393 B1 | 5/2004 | Friedl et al. |
| 6,744,011 B1 | 6/2004 | Hu et al. |
| 6,750,428 B2 | 6/2004 | Okamoto et al. |
| 6,765,584 B1 | 7/2004 | Wloka et al. |
| 6,772,802 B2 | 8/2004 | Few |
| 6,788,442 B1 | 9/2004 | Potin et al. |
| 6,795,778 B2 | 9/2004 | Dodge et al. |
| 6,798,974 B1 | 9/2004 | Nakano et al. |
| 6,857,553 B1 | 2/2005 | Hartman et al. |
| 6,858,817 B2 | 2/2005 | Blankenship et al. |
| 6,865,926 B2 | 3/2005 | O'Brien et al. |
| D504,449 S | 4/2005 | Butchko |
| 6,920,371 B2 | 7/2005 | Hillen et al. |
| 6,940,039 B2 | 9/2005 | Blankenship et al. |
| 6,982,700 B2 | 1/2006 | Rosenberg et al. |
| 7,021,937 B2 | 4/2006 | Simpson et al. |
| 7,024,342 B1 | 4/2006 | Waite et al. |
| 7,110,859 B2 | 9/2006 | Shibata et al. |
| 7,126,078 B2 | 10/2006 | Demers et al. |
| 7,132,617 B2 | 11/2006 | Lee et al. |
| 7,170,032 B2 | 1/2007 | Flood |
| 7,194,447 B2 | 3/2007 | Harvey et al. |
| 7,233,837 B2 | 6/2007 | Swain et al. |
| 7,247,814 B2 | 7/2007 | Ott |
| D555,446 S | 11/2007 | Picaza Ibarrondo |
| 7,298,535 B2 | 11/2007 | Kuutti |
| 7,315,241 B1 | 1/2008 | Daily et al. |
| D561,973 S | 2/2008 | Kinsley et al. |
| 7,353,715 B2 | 4/2008 | Myers |
| 7,363,137 B2 | 4/2008 | Brant et al. |
| 7,375,304 B2 | 5/2008 | Kainec et al. |
| 7,381,923 B2 | 6/2008 | Gordon et al. |
| 7,414,595 B1 | 8/2008 | Muffler |
| 7,465,230 B2 | 12/2008 | LeMay et al. |
| 7,474,760 B2 | 1/2009 | Hertzman et al. |
| 7,478,108 B2 | 1/2009 | Townsend et al. |
| 7,487,018 B2 | 2/2009 | Afshar et al. |
| D587,975 S | 3/2009 | Aronson, II et al. |
| 7,516,022 B2 | 4/2009 | Lee et al. |
| 7,534,005 B1 | 5/2009 | Buckman |
| 7,580,821 B2 | 8/2009 | Schirm et al. |
| D602,057 S | 10/2009 | Osicki |
| 7,621,171 B2 | 11/2009 | O'Brien |
| D606,102 S | 12/2009 | Bender et al. |
| 7,643,890 B1 | 1/2010 | Hillen et al. |
| 7,687,741 B2 | 3/2010 | Kainec et al. |
| D614,217 S | 4/2010 | Peters et al. |
| D615,573 S | 5/2010 | Peters et al. |
| 7,817,162 B2 | 10/2010 | Bolick et al. |
| 7,839,416 B2 | 11/2010 | Ebensberger et al. |
| 7,853,645 B2 | 12/2010 | Brown et al. |
| D631,074 S | 1/2011 | Peters et al. |
| 7,874,921 B2 | 1/2011 | Baszucki et al. |
| 7,970,172 B1 | 6/2011 | Hendrickson |
| 7,972,129 B2 | 7/2011 | O'Donoghue |
| 7,991,587 B2 | 8/2011 | Ihn |
| 8,069,017 B2 | 11/2011 | Hallquist |
| 8,224,881 B1 | 7/2012 | Spear et al. |
| 8,248,324 B2 | 8/2012 | Nangle |
| 8,265,886 B2 | 9/2012 | Bisiaux et al. |
| 8,274,013 B2 | 9/2012 | Wallace |
| 8,287,522 B2 | 10/2012 | Moses et al. |
| 8,301,286 B2 | 10/2012 | Babu et al. |
| 8,316,462 B2 | 11/2012 | Becker et al. |
| 8,363,048 B2 | 1/2013 | Gering |
| 8,365,603 B2 | 2/2013 | Lesage et al. |
| 8,512,043 B2 | 8/2013 | Choquet |
| 8,569,646 B2 | 10/2013 | Daniel et al. |
| 8,592,723 B2 | 11/2013 | Davidson et al. |
| 8,657,605 B2 | 2/2014 | Wallace et al. |
| 8,692,157 B2 | 4/2014 | Daniel et al. |
| 8,747,116 B2 | 6/2014 | Zboray et al. |
| 8,777,629 B2 * | 7/2014 | Kreindl .............. B23K 9/00 434/234 |
| 8,787,051 B2 | 7/2014 | Chang et al. |
| RE45,062 E | 8/2014 | Maguire, Jr. |
| 8,834,168 B2 | 9/2014 | Peters et al. |
| 8,851,896 B2 | 10/2014 | Wallace et al. |
| 8,860,760 B2 | 10/2014 | Chen et al. |
| 8,911,237 B2 | 12/2014 | Postlethwaite et al. |
| 8,915,740 B2 | 12/2014 | Zboray et al. |
| RE45,398 E | 3/2015 | Wallace |
| 8,992,226 B1 | 3/2015 | Leach et al. |
| 9,101,994 B2 | 3/2015 | Albrecht |
| 9,011,154 B2 | 4/2015 | Kindig et al. |
| 9,221,117 B2 | 12/2015 | Conrardy et al. |
| 9,293,056 B2 | 3/2016 | Zboray et al. |
| 9,293,057 B2 | 3/2016 | Zboray et al. |
| 9,323,056 B2 | 4/2016 | Williams |
| 9,779,635 B2 | 10/2017 | Zboray et al. |
| 2001/0045808 A1 | 11/2001 | Hietmann et al. |
| 2001/0052893 A1 | 12/2001 | Jolly et al. |
| 2002/0032553 A1 | 3/2002 | Simpson et al. |
| 2002/0039138 A1 | 4/2002 | Edelson et al. |
| 2002/0046999 A1 | 4/2002 | Veikkolainen et al. |
| 2002/0050984 A1 | 5/2002 | Roberts |
| 2002/0054211 A1 | 5/2002 | Edelson et al. |
| 2002/0085843 A1 | 7/2002 | Mann |
| 2002/0094026 A1 | 7/2002 | Edelson |
| 2002/0098468 A1 | 7/2002 | Barrett et al. |
| 2002/0111557 A1 | 8/2002 | Madill et al. |
| 2002/0132213 A1 | 9/2002 | Grant et al. |
| 2002/0135695 A1 | 9/2002 | Edelson et al. |
| 2002/0175897 A1 | 11/2002 | Pelosi |
| 2002/0178038 A1 | 11/2002 | Grybas |
| 2002/0180761 A1 | 12/2002 | Edelson et al. |
| 2003/0000931 A1 | 1/2003 | Ueda et al. |
| 2003/0002740 A1 | 1/2003 | Melikian et al. |
| 2003/0023592 A1 | 1/2003 | Modica et al. |
| 2003/0025884 A1 | 2/2003 | Hamana et al. |
| 2003/0075534 A1 | 4/2003 | Okamoto et al. |
| 2003/0106787 A1 | 6/2003 | Santilli |
| 2003/0111451 A1 | 6/2003 | Blankenship et al. |
| 2003/0172032 A1 | 9/2003 | Choquet |
| 2003/0186199 A1 | 10/2003 | McCool et al. |
| 2003/0217997 A1 * | 11/2003 | Clauer .............. G01N 21/95 219/121.85 |
| 2003/0228560 A1 | 12/2003 | Seat et al. |
| 2003/0234885 A1 | 12/2003 | Pilu |
| 2004/0009462 A1 | 1/2004 | McElwrath |
| 2004/0020907 A1 | 2/2004 | Zauner et al. |
| 2004/0035990 A1 | 2/2004 | Ackeret |
| 2004/0050824 A1 | 3/2004 | Samler |
| 2004/0088071 A1 | 5/2004 | Kouno et al. |
| 2004/0140301 A1 | 7/2004 | Blankenship et al. |
| 2004/0167788 A1 | 8/2004 | Birimisa et al. |
| 2004/0181382 A1 | 9/2004 | Hu et al. |
| 2005/0007504 A1 | 1/2005 | Fergason |
| 2005/0017152 A1 | 1/2005 | Fergason |
| 2005/0029326 A1 * | 2/2005 | Henrikson ......... B23K 9/0956 228/8 |
| 2005/0046584 A1 | 3/2005 | Breed |
| 2005/0050168 A1 | 3/2005 | Wen et al. |
| 2005/0101767 A1 | 5/2005 | Clapham et al. |
| 2005/0103766 A1 | 5/2005 | Iizuka et al. |
| 2005/0103767 A1 | 5/2005 | Kainec et al. |
| 2005/0109735 A1 | 5/2005 | Flood |
| 2005/0128186 A1 | 6/2005 | Shahoian et al. |
| 2005/0133488 A1 | 6/2005 | Blankenship et al. |
| 2005/0159840 A1 | 7/2005 | Lin et al. |
| 2005/0163364 A1 | 7/2005 | Beck et al. |
| 2005/0189336 A1 | 9/2005 | Ku |

(56) References Cited

U.S. PATENT DOCUMENTS

| | | | |
|---|---|---|---|
| 2005/0199602 A1 | 9/2005 | Kaddani et al. | |
| 2005/0230573 A1 | 10/2005 | Ligertwood | |
| 2005/0233295 A1 | 10/2005 | Chiszar et al. | |
| 2005/0252897 A1 | 11/2005 | Hsu et al. | |
| 2005/0275913 A1 | 12/2005 | Vesely et al. | |
| 2005/0275914 A1 | 12/2005 | Vesely et al. | |
| 2006/0014130 A1 | 1/2006 | Weinstein | |
| 2006/0076321 A1 | 4/2006 | Maev et al. | |
| 2006/0136183 A1 | 6/2006 | Choquet | |
| 2006/0140502 A1 | 6/2006 | Tseng et al. | |
| 2006/0154226 A1 | 7/2006 | Maxfield | |
| 2006/0163227 A1 | 7/2006 | Hillen et al. | |
| 2006/0163228 A1 | 7/2006 | Daniel | |
| 2006/0166174 A1 | 7/2006 | Rowe et al. | |
| 2006/0169682 A1 | 8/2006 | Kainec et al. | |
| 2006/0173619 A1 | 8/2006 | Brant et al. | |
| 2006/0189260 A1 | 8/2006 | Sung | |
| 2006/0207980 A1 | 9/2006 | Jacovetty et al. | |
| 2006/0213892 A1 | 9/2006 | Ott | |
| 2006/0214924 A1 | 9/2006 | Kawamoto et al. | |
| 2006/0226137 A1* | 10/2006 | Huismann | B23K 9/073 219/137.71 |
| 2006/0241432 A1 | 10/2006 | Herline et al. | |
| 2006/0252543 A1 | 11/2006 | Van Noland et al. | |
| 2006/0258447 A1 | 11/2006 | Baszucki et al. | |
| 2007/0034611 A1 | 2/2007 | Drius et al. | |
| 2007/0038400 A1 | 2/2007 | Lee et al. | |
| 2007/0045488 A1 | 3/2007 | Shin | |
| 2007/0088536 A1 | 4/2007 | Ishikawa | |
| 2007/0102479 A1* | 5/2007 | Kan | B23K 9/126 228/45 |
| 2007/0112889 A1 | 5/2007 | Cook et al. | |
| 2007/0188606 A1 | 8/2007 | Atkinson et al. | |
| 2007/0198117 A1 | 8/2007 | Wajihuddin | |
| 2007/0211026 A1 | 9/2007 | Ohta | |
| 2007/0221797 A1 | 9/2007 | Thompson et al. | |
| 2007/0256503 A1 | 11/2007 | Wong et al. | |
| 2007/0264620 A1 | 11/2007 | Maddix et al. | |
| 2007/0277611 A1 | 12/2007 | Portzgen et al. | |
| 2007/0291035 A1 | 12/2007 | Vesely et al. | |
| 2008/0021311 A1 | 1/2008 | Goldbach | |
| 2008/0027594 A1 | 1/2008 | Jump et al. | |
| 2008/0031774 A1 | 2/2008 | Magnant et al. | |
| 2008/0038702 A1 | 2/2008 | Choquet | |
| 2008/0061049 A1 | 3/2008 | Albrecht | |
| 2008/0078811 A1 | 4/2008 | Hillen et al. | |
| 2008/0078812 A1 | 4/2008 | Peters et al. | |
| 2008/0107345 A1 | 5/2008 | Melikian | |
| 2008/0117203 A1 | 5/2008 | Gering | |
| 2008/0120075 A1 | 5/2008 | Wloka | |
| 2008/0128398 A1 | 6/2008 | Schneider | |
| 2008/0135533 A1 | 6/2008 | Ertmer et al. | |
| 2008/0140815 A1 | 6/2008 | Brant et al. | |
| 2008/0149686 A1 | 6/2008 | Daniel et al. | |
| 2008/0203075 A1* | 8/2008 | Feldhausen | B23K 9/013 219/136 |
| 2008/0233550 A1 | 9/2008 | Solomon | |
| 2008/0249998 A1 | 10/2008 | Dettinger et al. | |
| 2008/0303197 A1 | 12/2008 | Paquette et al. | |
| 2008/0314887 A1 | 12/2008 | Stoger et al. | |
| 2009/0015585 A1 | 1/2009 | Klusza | |
| 2009/0021514 A1 | 1/2009 | Klusza | |
| 2009/0045183 A1 | 2/2009 | Artelsmair et al. | |
| 2009/0048509 A1* | 2/2009 | Wu | G01B 7/003 600/424 |
| 2009/0050612 A1 | 2/2009 | Serruys et al. | |
| 2009/0057286 A1 | 3/2009 | Ihara et al. | |
| 2009/0109128 A1 | 4/2009 | Nangle | |
| 2009/0152251 A1 | 6/2009 | Dantinne et al. | |
| 2009/0173726 A1 | 7/2009 | Davidson et al. | |
| 2009/0184098 A1 | 7/2009 | Daniel et al. | |
| 2009/0197228 A1 | 8/2009 | Afshar et al. | |
| 2009/0200281 A1 | 8/2009 | Hampton | |
| 2009/0200282 A1 | 8/2009 | Hampton | |
| 2009/0231423 A1 | 9/2009 | Becker et al. | |
| 2009/0257655 A1 | 10/2009 | Melikian | |
| 2009/0259444 A1 | 10/2009 | Dolansky et al. | |
| 2009/0298024 A1* | 12/2009 | Batzler | B23K 9/32 434/234 |
| 2009/0312958 A1 | 12/2009 | Dai et al. | |
| 2009/0325699 A1 | 12/2009 | Delgiannidis | |
| 2010/0012017 A1 | 1/2010 | Miller | |
| 2010/0012637 A1 | 1/2010 | Jaeger | |
| 2010/0021051 A1 | 1/2010 | Melikian et al. | |
| 2010/0048273 A1 | 2/2010 | Wallace et al. | |
| 2010/0062405 A1* | 3/2010 | Zboray | G09B 19/24 434/234 |
| 2010/0062406 A1* | 3/2010 | Zboray | G09B 19/003 434/234 |
| 2010/0096373 A1 | 4/2010 | Hillen et al. | |
| 2010/0121472 A1 | 5/2010 | Babu et al. | |
| 2010/0133247 A1 | 6/2010 | Mazumder et al. | |
| 2010/0133250 A1 | 6/2010 | Sardy et al. | |
| 2010/0176107 A1 | 7/2010 | Bong | |
| 2010/0201803 A1* | 8/2010 | Melikian | B23K 9/32 348/90 |
| 2010/0224610 A1 | 9/2010 | Wallace | |
| 2010/0276396 A1 | 11/2010 | Cooper et al. | |
| 2010/0299101 A1* | 11/2010 | Shimada | G09B 23/28 702/150 |
| 2010/0307249 A1 | 12/2010 | Lesage et al. | |
| 2010/0314362 A1 | 12/2010 | Albrecht | |
| 2011/0006047 A1 | 1/2011 | Penrod et al. | |
| 2011/0048273 A1 | 3/2011 | Colon | |
| 2011/0052046 A1 | 3/2011 | Melikian | |
| 2011/0060568 A1 | 3/2011 | Goldfine et al. | |
| 2011/0082728 A1 | 4/2011 | Melikian | |
| 2011/0091846 A1 | 4/2011 | Kreindl et al. | |
| 2011/0114615 A1 | 5/2011 | Daniel et al. | |
| 2011/0116076 A1 | 5/2011 | Chantry et al. | |
| 2011/0117527 A1 | 5/2011 | Conrardy et al. | |
| 2011/0122495 A1 | 5/2011 | Togashi | |
| 2011/0183304 A1* | 7/2011 | Wallace | G09B 19/24 434/234 |
| 2011/0187746 A1 | 8/2011 | Suto et al. | |
| 2011/0187859 A1 | 8/2011 | Edelson | |
| 2011/0229864 A1 | 9/2011 | Short et al. | |
| 2011/0248864 A1 | 10/2011 | Becker et al. | |
| 2011/0316516 A1 | 12/2011 | Schiefermller et al. | |
| 2012/0189993 A1 | 7/2012 | Kindig et al. | |
| 2012/0291172 A1 | 11/2012 | Wills et al. | |
| 2012/0298640 A1 | 11/2012 | Conrardy et al. | |
| 2013/0026150 A1 | 1/2013 | Chantry et al. | |
| 2013/0040270 A1* | 2/2013 | Albrecht | B23K 9/00 434/234 |
| 2013/0049976 A1 | 2/2013 | Maggiore | |
| 2013/0075380 A1 | 3/2013 | Albrech et al. | |
| 2013/0119040 A1 | 5/2013 | Suraba et al. | |
| 2013/0170259 A1 | 7/2013 | Chang et al. | |
| 2013/0182070 A1* | 7/2013 | Peters | G09B 5/02 348/43 |
| 2013/0183645 A1* | 7/2013 | Wallace | G09B 5/02 434/234 |
| 2013/0189657 A1* | 7/2013 | Wallace | G09B 5/00 434/234 |
| 2013/0189658 A1* | 7/2013 | Peters | G09B 5/00 434/234 |
| 2013/0203029 A1 | 8/2013 | Choquet | |
| 2013/0206740 A1 | 8/2013 | Pfeifer et al. | |
| 2013/0209976 A1* | 8/2013 | Postlethwaite | G09B 19/003 434/234 |
| 2013/0230832 A1* | 9/2013 | Peters | G09B 19/24 434/234 |
| 2013/0231980 A1 | 9/2013 | Elgart et al. | |
| 2013/0252214 A1 | 9/2013 | Choquet | |
| 2013/0288211 A1 | 10/2013 | Patterson et al. | |
| 2013/0327747 A1 | 12/2013 | Dantinne et al. | |
| 2013/0342678 A1 | 12/2013 | McAninch et al. | |
| 2014/0038143 A1 | 2/2014 | Daniel et al. | |
| 2014/0042136 A1 | 2/2014 | Daniel et al. | |
| 2014/0065584 A1* | 3/2014 | Wallace | G09B 5/00 434/234 |
| 2014/0134580 A1 | 5/2014 | Becker | |

(56) References Cited

U.S. PATENT DOCUMENTS

| | | |
|---|---|---|
| 2014/0263224 A1 | 9/2014 | Becker |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0312020 A1 | 10/2014 | Daniel |
| 2014/0346158 A1 | 11/2014 | Matthews |
| 2015/0056584 A1 | 2/2015 | Boulware et al. |
| 2015/0056585 A1 | 2/2015 | Boulware et al. |
| 2015/0056586 A1 | 2/2015 | Penrod et al. |
| 2015/0072323 A1 | 3/2015 | Postlethwaite et al. |
| 2015/0125836 A1* | 5/2015 | Daniel ............... G09B 19/24 434/234 |
| 2015/0170539 A1 | 6/2015 | Chica Barrera et al. |
| 2015/0194073 A1 | 7/2015 | Becker et al. |
| 2015/0234189 A1 | 8/2015 | Lyons |
| 2015/0235565 A1 | 8/2015 | Postlethwaite et al. |
| 2015/0248845 A1 | 9/2015 | Postlethwaite et al. |
| 2015/0268473 A1 | 9/2015 | Yajima et al. |
| 2016/0093233 A1 | 3/2016 | Boulware et al. |
| 2016/0125763 A1 | 5/2016 | Becker |
| 2016/0203734 A1 | 7/2016 | Boulware et al. |
| 2016/0203735 A1 | 7/2016 | Boulware et al. |
| 2016/0260261 A1 | 9/2016 | Hsu |
| 2016/0331592 A1 | 11/2016 | Stewart |
| 2016/0343268 A1 | 11/2016 | Postlethwaite et al. |
| 2016/0356971 A1* | 12/2016 | de Jong ............... G02B 6/4214 |
| 2017/0045337 A1 | 2/2017 | Kim |
| 2017/0053557 A1 | 2/2017 | Daniel |
| 2017/0249857 A1* | 8/2017 | Bauer ................. B23K 9/0956 |
| 2018/0133918 A1* | 5/2018 | Itoh ..................... B26F 1/16 |
| 2018/0274949 A1* | 9/2018 | Kubozono ............. G01D 5/206 |
| 2019/0151975 A1* | 5/2019 | Campbell ............. B23K 9/0956 |

FOREIGN PATENT DOCUMENTS

| | | |
|---|---|---|
| CN | 201083660 Y | 7/2008 |
| CN | 201149744 Y | 11/2008 |
| CN | 101406978 A | 4/2009 |
| CN | 101419755 A | 4/2009 |
| CN | 201229711 Y | 4/2009 |
| CN | 101571887 A | 11/2009 |
| CN | 101587659 A | 11/2009 |
| CN | 101661589 A | 3/2010 |
| CN | 102053563 A | 5/2011 |
| CN | 102202836 A | 9/2011 |
| CN | 202053009 U | 11/2011 |
| CN | 202684308 U | 1/2013 |
| CN | 203503228 U | 3/2014 |
| CN | 103871279 A | 6/2014 |
| CN | 106927696 A * | 7/2017 |
| DE | 2833638 A1 | 2/1980 |
| DE | 3244307 A1 | 5/1984 |
| DE | 4037879 A1 | 6/1991 |
| DE | 19615069 A1 | 10/1997 |
| DE | 19834205 A1 | 2/2000 |
| DE | 102005047204 A1 | 4/2007 |
| DE | 102006048165 A1 | 1/2008 |
| DE | 102010038902 A1 | 2/2012 |
| EP | 0008527 B1 | 1/1982 |
| EP | 108599 A1 | 5/1984 |
| EP | 127299 A1 | 12/1984 |
| EP | 145891 A1 | 6/1985 |
| EP | 319623 B1 | 10/1990 |
| EP | 852986 A1 | 7/1998 |
| EP | 1527852 A1 | 5/2005 |
| EP | 1905533 A2 | 4/2008 |
| ES | 2274736 A1 | 5/2007 |
| FR | 1456780 A | 7/1966 |
| FR | 2827066 A1 | 1/2003 |
| FR | 2926660 A1 | 7/2009 |
| GB | 1455972 A | 11/1976 |
| GB | 1511608 A | 5/1978 |
| GB | 2254172 A | 9/1992 |
| GB | 2435838 A | 9/2007 |
| GB | 2454232 A | 5/2009 |
| JP | 57097872 A * | 6/1982 |
| JP | 02224877 A | 9/1990 |
| JP | 05329645 A | 12/1993 |
| JP | 07047471 A | 2/1995 |
| JP | 07232270 A | 9/1995 |
| JP | 08132274 A | 5/1996 |
| JP | 08150476 A | 6/1996 |
| JP | 08505091 A | 6/1996 |
| JP | 08221107 A | 9/1996 |
| JP | 11320093 A * | 11/1999 |
| JP | 2000167666 A | 6/2000 |
| JP | 2000237872 A | 9/2000 |
| JP | 2001071140 A | 3/2001 |
| JP | 2002278670 A | 9/2002 |
| JP | 2003200372 A | 7/2003 |
| JP | 2004025270 A | 1/2004 |
| JP | 2005028449 A * | 2/2005 ........... B23K 9/0953 |
| JP | 2006006604 A | 1/2006 |
| JP | 2006175205 A | 7/2006 |
| JP | 2006281270 A | 10/2006 |
| JP | 2007290025 A | 11/2007 |
| JP | 2009160636 A | 7/2009 |
| JP | 2010231792 A | 10/2010 |
| JP | 2012024867 A | 2/2012 |
| KR | 100876425 B1 | 12/2008 |
| KR | 20090010693 A | 1/2009 |
| KR | 20110068544 A | 6/2011 |
| RU | 527045 C | 7/1995 |
| RU | 2008108601 A | 9/2009 |
| SU | 1038963 A1 | 8/1983 |
| WO | 9845078 A1 | 10/1998 |
| WO | 0112376 A1 | 2/2001 |
| WO | 0143910 A1 | 6/2001 |
| WO | 0158400 A1 | 8/2001 |
| WO | 2004029549 A2 | 4/2004 |
| WO | 2005102230 A1 | 11/2005 |
| WO | 2005110658 A2 | 11/2005 |
| WO | 2006034571 A1 | 4/2006 |
| WO | 2007039278 A1 | 4/2007 |
| WO | 2009060231 A1 | 5/2009 |
| WO | 2009120921 A1 | 10/2009 |
| WO | 2009/146359 A1 | 12/2009 |
| WO | 2009149740 A1 | 12/2009 |
| WO | 2010000003 A2 | 1/2010 |
| WO | 2010044982 A1 | 4/2010 |
| WO | 2010091493 A1 | 8/2010 |
| WO | 2011045654 A1 | 4/2011 |
| WO | 2011058433 A1 | 5/2011 |
| WO | 2011059502 A1 | 5/2011 |
| WO | 2011067447 A1 | 6/2011 |
| WO | 2011097035 A2 | 8/2011 |
| WO | 2012016851 A1 | 2/2012 |
| WO | 2012082105 A1 | 6/2012 |
| WO | 2012143327 A1 | 10/2012 |
| WO | 2013014202 A1 | 1/2013 |
| WO | 2013025672 A2 | 2/2013 |
| WO | 2013061518 A1 | 5/2013 |
| WO | 2013114189 A1 | 8/2013 |
| WO | 2013119749 A1 | 8/2013 |
| WO | 2013175079 A1 | 11/2013 |
| WO | 2013186413 A1 | 12/2013 |
| WO | 2014007830 A1 | 1/2014 |
| WO | 2014019045 A1 | 2/2014 |
| WO | 2014020386 A1 | 2/2014 |
| WO | 2014140720 A1 | 9/2014 |
| WO | 2014184710 A2 | 11/2014 |
| WO | 2016137578 A1 | 9/2016 |

OTHER PUBLICATIONS

Bargteil et al., "A Texture Synthesis Method for Liquid Animations," Eurographics/ACM SIGGRAPH Symposium on Computer Animation, 2006, pp. 345-351.

Bargteil et al., "A Semi-Lagrangian Contouring Method for Fluid Simulation," ACM Transactions on Graphics, vol. 25, No. 1, Jan. 2006, pp. 19-38.

(56) References Cited

OTHER PUBLICATIONS

Chentanez et al., "Liquid Simulation on Lattice-Based Tetrahedral Meshes," Eurographics/ACM SIGGRAPH Symposium on Computer Animation (2007), 10 pages.

Chentanez et al., "Simultaneous Coupling of Fluids and Deformable Bodies," Eurographics/ ACM SIGGRAPH Symposium on Computer Animation, 2006, pp. 83-89.

Clausen et al., "Simulating Liquids and Solid-Liquid Interactions with Lagrangian Meshes," ACM Transactions on Graphics, vol. 32, No. 2, Article 17, Apr. 2013, pp. 17.1-17.15.

Feldman et al., "Animating Suspended Particle Explosions," Computer Graphics Proceedings, Annual Conference Series, Jul. 27-31, 2003, pp. 1-8.

Feldman et al., "Fluids in Deforming Meshes," Eurographics/ACM SIGGRAPH Symposium on Computer Animation (2005), pp. 255-259.

Foster et al., "Practical Animation of Liquids," ACM SIGGRAPH, Aug. 12-17, 2001, Los Angeles, CA, pp. 23-30.

Foster et al., "Realistic Animation of Liquids," Graphical Models and Image Processing, vol. 58, No. 5, Sep. 1996, pp. 471-483.

Goktekin et al., "A Method for Animating Viscoelastic Fluids," Computer Graphics Proceedings, Annual Conference Series, Aug. 8-12, 2004, pp. 1-6.

Holmberg et al., "Efficient Modeling and Rendering of Turbulent Water over Natural Terrain," Proceedings of the 2nd international conference on Computer graphics and interactive techniques in Australasia and South East Asia, Singapore, Jun. 15-18, 2004, pp. 15-22.

Irving et al., "Efficient Simulation of Large Bodies of Water by Coupling Two and ThreeDimensional Techniques," ACM Transactions on Graphics (TOG), vol. 25, Issue 3, Jul. 2006,pp. 805-811.

Kass et al., "Rapid, Stable Fluid Dynamics for Computer Graphics," Computer Graphics, vol. 24, No. 4, Aug. 1990, pp. 49-57.

Klinger et al., "Fluid Animation with Dynamic Meshes," Computer Graphics Proceedings, Annual Conference Series, Jul. 30-Aug. 3, 2006, 820-825.

Muller et al., "Particle-Based Fluid Simulation for Interactive Applications," Eurographics/SIGGRAPH Symposium on Computer Animation (2003), pp. 154-159 and 372.

O'Brien et al., "Dynamic Simulation of Splashing Fluids," Proceedings of Computer Animation '95, Apr. 19-21, 1995, in Geneva, Switzerland, pp. 198-205.

Premoze et al., "Particle-Based Simulation of Fluids," EUROGRAPHICS, vol. 22, No. 3, 2003, 10 pages.

Rasmussen et al., "Directable Photorealistic Liquids," Eurographics/ACM SIGGRAPH Symposium on Computer Animation (2004), pp. 193-202.

Stam, "Stable Fluids," SIGGRAPH 99 Conference Proceedings, Annual Conference Series, Aug. 1999, 121-128.

Thurey et al., "Real-time Breaking Waves for Shallow Water Simulations," Proceedings of the Pacific Conference on Computer Graphics and Applications, Maui, Hawaii, Oct. 29-Nov. 2, 2007, 8 pages.

Yaoming, "Applications of Microcomputer in Robot Technology," Scientific and Technical Documentation Press, Sep. 1987, pp. 360-365.

Fast, K. et al., "Virtual Training for Welding", Mixed and Augmented Reality, 2004, ISMAR 2004, Third IEEE and CM International Symposium on Arlington, VA, Nov. 2-5, 2004.

TEREBES: examples from http://www.terebes.uni-bremen.de.; 6 pages.

Weld nut, Wikipedia, 2 pgs. Printed Feb. 6, 2014.

Https://app.aws.org/conferences/defense/live index.html (AWS Welding in the Defense Industry conference schedule, 2004); 12 pages.

Johannes Hirche, Alexander Ehlert, Stefan Guthe, Michael Doggett, Hardware Accelerated Per-Pixel Displacement Mapping, 8 pages, 2004.

Kenneth Fast, Timothy Gifford, Robert Yancey, "Virtual Training for Welding", Proceedings of the Third IEEE and ACM International Symposium on Mixed and Augmented Reality (ISMAR 2004); 2 pages.

Numerical Analysis of Metal Transfer in Gas Metal Arc Welding Under Modified Pulsed Current Conditions, G. Wang, P.G. Huang, and Y.M. Zhang. Metallurgical and Materials Transactions B, vol. 35B, Oct. 2004, pp. 857-866.

Wade, "Human uses of ultrasound: ancient and modern" Department of Electrical and Computer Engineering, University of California at Santa Barbara 93106, USA. Ultrasonics (Impact Factor: 1.81). Apr. 2000; 38(1-8):1-5.

Mechanisms and Mechanical Devices Sourcebook, Chironis, McGraw Hill, Neil Sclater, 2nd Ed. 1996.

https://app.aws.org/wj/2004/04/052/njc (AWS Virtual Reality Program to Train Welders for Shipbuilding, workshop information, 2004); 7 pages.

Abbas, M., et al.; Code_Aster; Introduction to Code_Aster; User Manual; Booklet U1.0—: Introduction to Code_Aster; Document: U1.02.00; Version 7.4; Jul. 22, 2005.

Abid, et al., "Numerical Simulation to study the effect of tack welds and root gap on welding deformations and residual stresses of a pipe flange joint" Intl. J. of Pressure Vessels and Piping, 82, pp. 860-871 (2005).

Andrew Nealen, "Point-Based Animation of Elastic, Plastic, and Melting Objects," CG topics, Feb. 2005; 2 pages.

Cooperative Research Program, Virtual Reality Welder Training, Summary Report SR 0512, 4 pages, Jul. 2005.

Eduwelding+, Weld Into the Future; Online Welding Seminar—A virtual training environment; 123arc.com; 4 pages, 2005.

Lincoln Electric, Vrtex 360 Virtual Reality Arc Welding Trainer, 4 pgs., Oct. 2014.

Https://app.aws_org/w/r/www/wj/2005/031WJ_2005_03.pdf (AWS Welding Journal, Mar. 2005 (see, e.g., p. 54)).; 114 pages.

Http://www.nsrp.org/6-Presentations/WVDVirtual_Welder.pdf (Virtual Reality Welder Training, Project No. SI051, NavyManTech Program, Project Review for ShipTech 2005); 22 pages. Biloxi, MS.

Nordruch, Stefan, et al. "Visual Online Monitoring of PGMAW Without a Lighting Unit", Jan. 2005; 14 pages.

Porter, et al., Virtual Reality Training, Paper No. 2005-P19, 14 pages, 2005.

Websters II new college dictionary, 3rd ed., Houghton Mifflin Co., copyright 2005, Boston, MA, p. 1271, definition of Wake. 3 pages.

16th International Ship and Offshore Structures Congress : Aug. 20-25, 2006; Southhampton, U.K. vol. 2 Specialist Committee V.3 Fabrication Technology Committee Mandate: T. Borzecki, G. Bruce, Y.S. Han, M. Heinermann, A. Imakita, L. Josefson, W. Nie, D. Olsen, F. Roland and Y. Takeda. Naval Ship Design, ABS Papers 2006.

Hillers, B.; Graser, A. "Direct welding arc observation without harsh flicker," 8 pags, allegedly FABTECH International and AWS welding show, 2007.

B. Hillers, D. Aitenau, P. Tschirner, M. Park, A. Graser, B. Balazs, L. Schmidt, "TEREBES: Welding Helmet with AR Capabilities", Institute of Automatic University Bremen; Institute of Industrial Engineering and Ergonomics, 10 pages, allegedly 2004.

American Welding Society, "Vision for Welding Industry", 41 pages.

Lincoln Electric, VRTEX Virtual Reality Arc Welding Trainer, 9 pgs. Printed Feb. 2, 2014.

Isaac Brana Veiga, Simulation of a Work Cell in the IGRIP Program, dated 2006, 50 pages.

Aiteanu, Dorian; and Graser, Axel. "Generation and Rendering of a Virtual Welding Seam in an Augmented Reality Training Environment." Proceedings of the Sixth IASTED International Conference on Visualization, Imaging and Image Processing, Aug. 28-30, 2006, 8 pages, allegedly Palma de Mallorca, Spain. Ed. J.J. Villaneuva. ACTA Press.

The Lincoln Electric Company; CheckPoint Production Monitoring brochure; four (4) pages; http://www.lincolnelectric.com/assets/en_US/products/literature/s232.pdf; Publication S2.32; Issue Date Feb. 2012.

(56) References Cited

OTHER PUBLICATIONS

Mavrikios D et al, A prototype virtual reality-based demonstrator for immersive and interactive simulation of welding processes, International Journal of Computer Integrated manufacturing, Taylor and Francis, Basingstoke, GB, vol. 19, No. 3, Apr. 1, 2006, pp. 294-300.
Aiteanu, Dorian; and Graser, Axel. "Computer-Aided Manual Welding Using an Augmented Reality Supervisor" Sheet Metal Welding Conference XII, Livonia, MI, May 9-12, 2006, 14 pages.
Patrick Rodjito, Position tracking and motion prediction using Fuzzy Logic, 81 pages, 2006, Colby College, Honors Theses, Paper 520.
Porter et al., Virtual Reality Welder Training, 29 pages, dated Jul. 14, 2006.
Porter, Virtual Reality Welder Trainer, Session 5: Joining Technologies for Naval Applications: earliest date Jul. 14, 2006 (http://weayback.archive.org), Edision Welding Institute; J. Allan Cote, General Dynamics Electric Boat; Timothy D. Gifford, VRSim, and Wim Lam, FCS Controls.
Sheet Metal Welding Conference XI r, American Welding Society Detroit Section, May 2006, 11 pages.
Production Monitoring 2 brochure, four (4) pages, The Lincoln Electric Company, May 2009.
Wang et al., Study on welder training by means of haptic guidance and virtual reality for arc welding, 2006 IEEE International Conference on Robotics and Biomimetics, ROBIO 2006 ISBN-10: 1424405718, p. 954-958.
Learning Labs, Inc., Seabery, Soldamatic Augmented Reality Welding Trainers, 4 pgs., printed Mar. 20, 2014.
ANSI/A WS D 10.11 MID 10. 11 :2007 Guide for Root Pass Welding of Pipe without Backing Edition: 3rd American Welding Society / Oct. 13, 2006/36 pages ISBN: 0871716445, 6 pages.
asciencetutor.com, A division of Advanced Science and Automation Corp., VWL (Virtual Welding Lab), 2 pages, 2007.
Advance Program of American Welding Society Programs and Events. Nov. 11-14, 2007. 31 pages. Chicago.
Y. Wang et al., "Impingement of Filler Droplets and Weld Pool During Gas Metal Arc Welding Process" International Journal of Heat and Mass Transfer, Sep. 1999, 14 pages.
CS Wave, The Virtual Welding Trainer, 6 pages, 2007.
CS Wave—Manual, "Virtual Welding Workbench User Manual 3.0" 2007; 25 pages.
CUDA Programming Guide Version 1.1, Nov. 29, 2007. 143 pages.
J. Hu and Hi Tsai, Heat and mass transfer in gas metal arc welding. Part 1: the arc, found in ScienceDirect, International Journal of Heat and Mass Transfer 50 (2007), 14 pages, 833-846 Available on Line on Oct. 24, 2006 http://www.web.mst.edu/~tsai/publications/HU-IJHMT-2007-1-60.pdf.
Lim et al., "Automatic classification of weld defects using simulated data and MLP neural network" , Insight, vol. 49, No. 3, Mar. 2007.
Ratnam and Khalid: "Automatic classification of weld defects using simulated data and an MLP neutral network." Insight vol. 49, No. 3; Mar. 2007.
SIMFOR / CESOL, "RV-SOLD" Welding Simulator, Technical and Functional Features, 20 pages, no date available.
https://app.aws.org/wj/2007/11WJ200711.pdf (AWS Welding Journal, Nov. 2007); 240 pages.
Products/Visible Welding; Weldwatch Video Monitoring System; website prinout http://visible welding.com/products; 4 pages; 2015.
Seabury Soluciones, SOLDAMATIC Welding Trainer Simulator, 30 pages, printed Jan. 14, 2015.
Terebes; Institute of Automation; University of Bremen; Project Motivation Problems Using Traditional Welding Masks; 2 page ; 2015.
WUHAN ONEW Technology Co. Ltd., "ONEW-360 Welding Training Simulator," http://en.onewtech.com/_d276479751.htm as accessed on Jul. 10, 2015, 14 pages.
WeldWatch Software/Visible Welding; website printout; http://visiblewelding.com/weldwatch-software/4 pages; 2015.
Weldplus, Welding Simulator, 2 pages, printed Jan. 14, 2015.

Xie et al., "A Real-Time Welding Training System Base on Virtual Reality," Wuhan Onew Technology Co., Lid, IEEE Virtual Reality Conference 2015, Mar. 23-27, Arles France, pp. 309-310.
Arc+ – Archived Press Release from WayBack Machine from Jan. 31, 2008-Apr. 22, 2013, Page, https://web.3rchive.org/web/20121006041803/http://www.123certification.com/en/article_press/index.htm, Jan. 21, 2016, 3 pages.
Swantec corporate web page downloaded Apr. 19, 2016. httpl/www.swantec.com/technology/numerical-simulation/.
VIRSim Powering Virtual Reality, www.lincolnelectric.com/en-us/eguipment/Iraining-eguipment/Pages/powered-by-'rsim.aspx, 2016, 1 page.
Aiteanu, Dorin, Hillers, Bernd and Graser, Axel "A Step Forward in Manual Welding: Demonstration of Augmented Reality Helmet" Institute of Automation, University of Bremen, Germany, Proceedings of the Second IEEE and ACMInternational Symposium on Mixed and Augmented Reality; 2003; 2 pages.
Andreas Grahn, "Interactive Simulation of Contrast Fluid using Smoothed Particle Hydrodynamics," Jan. 1, 2008, Masters Thesis in Computing Science, Umea University, Department of Computing Science, Umea Sweden; 69 pages.
Choquet, Claude; "Arc+: Today's Virtual Reality Solution for Welders" Internet Page, Jan. 1, 2008, 6 pages.
CS Wave, A Virtual learning tool for welding motion, 10 pages, Mar. 14, 2008.
Choquet, Claude. "Arc+®: Today's Virtual Reality Solution for Welders", Published in Proceedings of the IIW International Conference; Jul. 10-11, 2008; 19 pages.
Da Dalto L, et al. "CS Wave A Virtual learning tool for the welding motion," Mar. 14, 2008; 10 pages.
Da Dalto L, et al. "CS Wave: Learning welding motion in a virtual environment" Published in Proceedings of the IIW International Conference, Jul. 10-11, 2008; 19 pages.
Edison Welding Institute, E-Weld Predictor, 3 pages, 2008.
Eduwelding+, Training Activities with arc+ simulator; Weld Into The Future, Online Welding Simulator—A virtual training environment; 123arc.com; 6 pages, May 2008.
FH Joanneum, Fronius—virtual welding, 2 pages, May 12, 2008.
Juan Vicenete Rosell Gonzales, "RV-Sold: simulator virtual para la formacion de soldadores"; Deformacion Metalica, Es. vol. 34, No. 301 Jan. 1, 2008.
Larry Jeffus, Welding Principles and Applications.Sixth Edition, 2008, 10 pages.
Linholm, E., et al., "NVIDIA Tesla: A Unified Graphics and Computing Architecture", IEEE Computer Society, 2008.
N. A. Tech., P/NA.3 Process Modeling and Optimization, 11 pages, Jun. 4, 2008.
Narayan et al., "Computer Aided Design and Manufacturing," pp. 3-4, 14-15, 17-18, 92-95, and 99-100, Dec. 31, 2008.
NSRP ASE, Low-Cost Virtual Reality Welder Training System, 1 Page, 2008.
Penrod, Matt. "New Welder Training Tools." EWI PowerPoint presentation; 16 pages allegedly 2008.
The Fabricator, Virtually Welding, Training in a virtual environment gives welding students a leg up, 4 pages, Mar. 2008.
The Evolution of Computer Graphics; Tony Tamasi, NVIDIA, 2008; 36 pages.
Virtual Welding: A Low Cost Virtual Reality Welder Training System, NSRP RA 07-01-BRP Oral Review Meeting in Charleston, SC at ATI, Mar. 2008; 6 pages.
Sandor, Christian; Klinker, Gudrun. "Lessons Learned in Designing Ubiquitous Augmented Reality User Interfaces." 21 pages, allegedly from Emerging Technologies of Augmented Reality: Interfaces Eds. Haller, M.; Billinghurst, M.; Thomas, B. Idea Group Inc. 2006.
Hillers, B.; Graser, A. "Real time Arc-Welding Video Observation System." 62nd International Conference of IIW, Jul. 12-17, 2009, 5 pages, allegedly Singapore 2009.
P. Beatriz Garcia-Allende, Jesus Mirapeix, Olga M. Conde, Adolfo Cobo and Jose M. Lopez-Higuera; Defect Detection in Arc-Welding Processes by Means of the Line-to-Continuum Method and Feature Selection; www.mdpi.com/journal/sensors; Sensors 2009, 9, 7753-7770; doi; 10.3390/s91007753.

(56) References Cited

OTHER PUBLICATIONS

Teeravarunyou, et al., "Computer Based Welding Training System", Intl J of Industrial Engineering, 16 (2), pp. 116-125 (2009).
White et al., Virtual welder trainer, 2009 IEEE Virtual Reality Conference, p. 303, 2009.
Miller Electric MGF Co.; MIG Welding System features weld monitoring software; NewsRoom 2010 (Dialog® File 992); 2011 Dialog. 2010; http://www.dialogweb.com/cgi/dwclient?reg=1331233430487; three (3) pages; printed Mar. 8, 2012.
Sim Welder, Train better welders faster, retrieved on Apr. 12, 2010 from: http://www.simwelder.com.
Fillet weld, Wikipedia, 3 pgs. Printed Feb. 6, 2014.
Yao et al., 'Development of a Robot System for Pipe Welding'. 2010 International Conference on Measuring Technology and Mechatronics Automation. Retrieved from the Internet: http://ieeexplore.ieee.org/stamp/stamp.jsp?tp=&arnumber=5460347&tag=1; pp. 1109-1112, 4 pages.
Antonelli, et al., "A Semi-Automated Welding Station Exploiting Human-robot Interaction", Dept. Of Production Systems and Economics, pp. 249-260, 2011.
Fronius, Virtual Welding/The Welder Training of the Future/, 8 page brochure, 2011.
Fite-Georgel, Pierre. "Is there a Reality in Industrial Augmented Reality?" 10th IEEE International Symposium onMixed and Augmented Reality (ISMAR). 10 pages, allegedly 2011.
ChemWeb.com, Journal of Materials Engineering and Performance (v.7, #5), 3 pgs., printed Sep. 26, 2012.
Kyt Dotson, Augmented Reality Welding Helmet Prototypes How Awesome the Technology Can Get, Sep. 26, 2012, Retrieved from the Internet: URL:http://siliconangle.com/blog/2012/09/26/augmented-reality-welding-helmet-prototypes-how-awesome-the-technology-can-get/,1 page, retrieved on Sep. 26, 2014.
NSRP—Virtual Welding—A Low Cost Virtual Reality Welder Training System—Phase II—Final Report; Feb. 29, 2012; Kenneth Fast, Jerry Jones, Valerie Rhoades; 53 pages.
Steve Mann, Raymond Chun Bing Lo, Kalin Ovtcharov, Shixiang Gu, David Dai, Calvin Ngan, Tao Al, Realtime HDR (High Dynamic Range) Video for Eyetap Wearable Computers, FPGA-Based Seeing Aids, and Glasseyes (Eyetaps), 2012 25th IEEE Canadian Conference on Electrical and Computer Engineering (CCECE),pp. 1-6, 6 pages, Apr. 29, 2012.
Terrence O'Brien, "Google's Project Glass gets some more details", Jun. 27, 2012 (Jun. 27, 2012), Retrieved from the Internet: http://www.engadget.com/2012/06/27/googles-project-glass-gets-some-more-details/, 1 page, retrieved on Sep. 26, 2014.
The Goodheart-Wilcox Co., Inc., Weld Joints and Weld Types, Chapter 6; pp. 57-68, date unknown.
Leap Motion, Inc., product information, copyright 2013, 14 pages.
Praxair "The RealWeld Trainer System", two page brochure, 2013.
Boss (engineering), Wikipedia, 1 page, printed Feb. 6, 2014.
EnergynTech Inc.; website printout; http://www.energyntech.com./; Advanced Metals Processing Technology & Flexible Automation for Manufacturing; Virtual Welder; Virtual training system for beginning welders; 2 page; 2014.
EnergynTech Inc.; website printout; http://www.energyntech.com/Zipper.html; Zipper Robot Performing a HiDep Weld; 1 page 2014.
Miller Electric Mfg. Co., "LiveArc Welding Performance Management System", 4 pg. brochure, Dec. 2014.
Miller Electric, Owner's Manual, Live Arc, Welding Performance Management System, Owners's Manual—OM-267 357A; 64 pgs., Jul. 2014.
ViziTech USA, Changing the Way America Learns, retrieved on Mar. 27, 2014 from http://vizitechusa.com/, 2 pages.
CS Wave, Product Description, 2 pages, printed Jan. 14, 2015.
Erden, "Skill Assistance with Robot for Manual Welding", Marie Curie Intra-European Fellowship, Project No. 297857, 3 pgs., printed Apr. 27, 2015.
EWM Virtual Welding Trainer, 2 pages, printed Jan. 14, 2015.
Fronius, Virtual Welding, 8 pages, printed Jan. 14, 2015.
Kemppi ProTrainer, product data, 3 pages, printed Jan. 14, 2015.

Extended European Search Report from Corresponding Application No. EP17001777.6; dated Feb. 21, 2018.
Wahi, Maxwell, and Reaugh, "Finite-Difference Simulation of a Multi-Pass Pipe Weld" ("Wahi", vol. L, paper Mar. 1, International Conference on Structural Mechanics in Reactor Technology, San Francisco, CA, Aug. 15-19, 1977.
R.J. Renwick et al., "Experimental Investigation of GTA Weld Pool Oscillations" Welding Research—Supplement to the Welding Journal, Feb. 1983, 7 pages.
Schoder, Robert, "Design and Implementation of a Video Sensor for Closed Loop Control of Back Bead Weld Puddle Width," Massachusetts Institute of Technology, Dept. of Mechanical Engineering, May 27, 1983.
William T. Reeves, "Particles Systems—A Technique for Modeling a Class of Fuzzy Objects", Computer Graphics 17:3 pp. 359-376, 1983, 17 pages.
M. Jonsson, L. Karlsson, and L-E Lindgren, Simulation of Tack Welding Procedures in Butt Joint Welding of Plates Welding Research Supplement, Oct. 1985, pp. 296-302.
Hills and Steele, Jr.; "Data Parallel Algorithms", Communications of the ACM, Dec. 1986, vol. 29, No. 12, p. 1170.
Screen Shot of CS Wave Control Centre V3.0.0 https://web.archive.org/web/20081128081817/http://wave.c-s.fr/mages/english/snap_evolution6.jpg; 1 page.
D. Tonnesen, Modeling Liquids and Solids using Thermal Particles, Proceedings of Graphics Interface 91 pages 255-262, Calgary, Alberta, 1991.
Chuansong Wu: "Microcomputer-based welder training simulator", Computers in Industry, vol. 20, No. 3, Oct. 1992, pp. 321-325, XP000205597, Elsevier Science Publishers, Amsterdam, NL.
Guu and Rokhlin ,Technique for Simultaneous Real-Time Measurements of Weld Pool Surface Geometry and Arc Force, Welding Research Supplement—pp. 473-482, Dec. 1992.
Bjorn G. Agren; Sensor Integration for Robotic Arc Welding; 1995; vol. 5604C of Dissertations Abstracts International p. 1123; Dissertation Abs Online (Dialog® File 35): 2012 ProQuest Info& Learning: http://dialogweb.com/cgi/dwclient?req=1331233317524, one (1) page; printed Mar. 8, 2012.
Screen Shot of CS Wave Control Centre V3.0.0 https://web.archive.org/web/20081128081915/http://wave.c-s.fr/images/english/snap_evolution4.jpg; 1 page.
Russell and Norvig, "Artificial Intelligence: A Modern Approach," Prentice-Hall (Copyright 1995).
Screen Shot of CS Wave Exercise 135.FWPG Root Pass Level 1 https://web.archive.org/web/20081128081858/http:/wave.c-s.fr/images/english/snap_evolution2.Jpg; 1 page.
Hoff et al., "Computer vision-based registration techniques for augmented reality," Proceedings of Intelligent Robots and Computer Vision XV, SPIE vol. 2904, Nov. 18-22, 1996, Boston, MA, pp. 538-548.
Fronius, ARS ELECTRONICA LINZ GMBH, High-speed video technology is applied to research on welding equipment, and the results are visualized in the CAVE, 2 pages, May 18, 1997.
S.B. Chen, L Wu, Q. L. Wang and Y. C. Liu, Self-Learning Fuzzy Neural Networks and Computer Vision for Control of Pulsed GTAW, Welding Research Supplement, pp. 201-209, dated May 1997.
Aidun et al., "Penetration in Spot GTA Welds during Centrifugation," Journal of Materials Engineering and Performance vol. 7(5) Oct. 1998—597-600.
Dorin Aiteanu "Virtual and Augmented Reality Supervisor for a New Welding Helmet" Dissertation Nov. 15, 2005; 154 pages.
Arc+ simulator; 2 pgs., http://www.123arc.com/en/depliant_ang.pdf; 2000.
Energetics, Inc. "Welding Technology Roadmap," Sep. 2000, 38 pages.
"Numerical Analysis of Metal Transfer in Gas Metal Arc Welding," G. Wang, P.G. Huang, and Y.M. Zhang. Departments of Mechanical and Electrical Engineering. University of Kentucky, Dec. 10, 2001.
Aidun, Daryush K "Influence of simulated high-g on the weld size of Al-Li-Alloy" Acta Astronautice, vol. 48, No. 2-3, pp. 153-156, 2001.

(56) References Cited

OTHER PUBLICATIONS

ASME Definitions, Consumables, Welding Positions, dated Mar. 19, 2001. See http://www.gowelding.com/wp/asme4.htm.
Kobayashi, Lshigame, and Kato, "Simulator of Manual Metal Arc Welding with Haptic Display ("Kobayashi 2001, Proc. of the 11th International Conf. on Artificial Reality and Telexistence (ICAT), Dec. 5-7, 2001, pp. 175-178, Tokyo, Japan.
Konstantinos Nasios (Bsc), Improving Chemical Plant Safety Training Using Virtual Reality, Thesis submitted to the University of Nottingham for the Degree of Doctor of Philosophy, 313 pages, Dec. 2001.
M. Abbas, F. Waeckel, Code Aster (Software) EDF (France), 14 pages, Oct. 2001.
Welding Handbook, Welding Science & Technology, American Welding Society, Ninth Ed., Copyright 2001. Appendix A "Terms and Definitions" 54 pages.
ArcSentry Weld Quality Monitoring System; Native American Technologies, allegedly 2002, 5 pages.
D'Huart, Deat, and Lium; Virtual Environment for Training: An Art of Enhancing Realtity, 6th International Conference, ITS 20002, Biarritz, France and San Sebastian, Spain, 6 pages, Jun. 2002.
J.Y. (Yosh) Mantinband, Hillel Goldenberg, Llan Kleinberger, Paul Kleinberger, Autosteroscopic, field-sequential display with full freedom of movement OR Let the display were the shutter-glasses, yosh@3ality.com, (Israel) Ltd., 8 pages, 2002.
Mahrle et al., "The influence of fluid flow phenomena on the laser beam welding process", Intl. J. of Heat and Fluid Flow, 23, pp. 288-297 (2002).
Tschirner, Petra; Hillers, Bernd; and Graser, Axel "A Concept for the Application of Augmented Reality in Manual GasMetal Arc Welding." Proceedings of the International Symposium on Mixed and Augmented Reality; 2 pages; 2002.
P/NA.3 Process Modelling and Optimization; Native American Technologies, allegedly 2002, 5 pages.
P. Tschirner et al., "Virtual and Augmented Reality for Quality Improvement of Manual Welds" National Institute of Standards and Technology, Jan. 2002, Publication 973, 24 pages.
ARVIKA Forum Vorstellung Projekt PAARI. BMW Group Virtual Reality Center. 4 pages. Nuemberg. 2003.
Desroches, X.; Code-Aster, Note of use for calculations of welding; Instruction manual U2.03 booklet: Thermomechanical; Document: U2.03.05; Oct. 1, 2003.
Echtler et al., "The Intelligent Welding Gun: Augmented Reality of Experimental Vehicle Construction", Virtual and Augmented Reality Applications in Manufacturing, 17, pp. 1-27, Springer Verlag, 2003.
High Performance Computer Architectures_ A Historical Perspective, downloaded May 5, 2016.http://homepages.inf.ed.ac.uk/cgi/mi/comparch. pl?Paru/perf.html,Paru/perf-f.html,Paru/menu-76.html; 3 pages.
G.E. Moore, No exponential is forever: but 'Forever can be delayed!: IEEE International Solid-State Circuits Conference, 2003. 19 pages.
Kobayashi, Ishigame, and Kato, "Skill Training System of Manual Arc Welding By Means of Face-Shield-Like HMD and Virtual Electrode" ("Kobayashi 2003"), Entertainment Computing, vol. 112 of the International Federation for Information Processing (IFIP), Springer Science + Business Media, New York, copyright 2003, pp. 389-396.
M. Ian Graham, Texture Mapping, Carnegie Mellon University Class 15-462 Computer Graphics, Lecture 10, 53 pages, dated Feb. 13, 2003.
Hillers, Bernd; Aiteanu, Dorin and Graser, Axel "Augmented Reality—Helmet for the Manual Welding Process." Institute of Automation, University of Bremen, Germany; 21 pages.
Impact Welding: examples from current and archived website, trade shows, etc. See, e.g., http://www.impactwelding.com. 53 pages.
Sandor, Christian; Gudrun Klinker. "PAARTI: Development of an Intelligent Welding Gun for BMW." PIA2003, 7 pages, Tokyo. 2003.
Marcus Vesterlund, "Simulation and Rendering of a Viscous Fluid using Smoothed Particle Hydrodynamics," Dec. 3, 2004, Master's Thesis in Computing Science, Umea University, Department of Computing Science, Umea Sweden; 46 pages.
Catalina, Stefanescu, Sen, and Kaukler, 'Interaction Of Porosity with a Planar Solid/Liquid Interface" ("Catalina'), Metallurgical and Materials Transactions, vol. 35A, May 2004, pp. 1525-1538.
Balijepalli, A. and Kesavadas, A Haptic Based Virtual Gringing Tool, Haptic Interfaces for Virtual Environment and Teleoperator Systems, Haptics 2003, 7—.,Department of Mechanical & Aerospace Engineering, State University of New York at Buffalo, NY.

* cited by examiner

MAGNETIC FREQUENCY SELECTION FOR ELECTROMAGNETIC POSITION TRACKING

RELATED APPLICATION

The present application is being filed as a non-provisional patent application claiming priority/benefit under 35 U.S.C. § 119(e) from U.S. Provisional Patent Application No. 62/417,513 filed on Nov. 4, 2016, the entire disclosure of which is incorporated herein by reference.

TECHNICAL FIELD

The described invention relates in general to a system for and method of tracking and characterizing manual welding operations, and more specifically to a system for providing an electromagnetic tracking system with universal transmitter and with selectable transmission frequencies to overcome interference and communicate reliably with various receivers.

BACKGROUND

The manufacturing industry's desire for efficient and economical welder training has been a well-documented topic over the past decade as the realization of a severe shortage of skilled welders is becoming alarmingly evident in today's factories, shipyards, and construction sites. A rapidly retiring workforce, combined with the slow pace of traditional instructor-based welder training has been the impetus for the development of more effective training technologies. To date, the majority of welding processes are performed manually, yet the field is lacking practical commercially available tools to track the performance of these manual (and semi-automatic) processes. Innovations which allow for the accelerated training of the manual dexterity skills specific to welding, along with the expeditious indoctrination of welding fundamentals are becoming a necessity. The tracking and characterization system disclosed herein addresses this vital need for improved welder training and enables the monitoring of manual and other welding processes, both actual and simulated, to ensure the processes are within permissible limits necessary to meet industry-wide quality requirements. Thus, there is an ongoing need for an effective system for training welders to properly execute various types of welds under various conditions and for general tracking to know position information. In particular to tracking technology used in these applications, there is a need for a system that can track multiple elements using receivers at each element at the same time without dedicated transmission systems for each receiver.

SUMMARY

The present invention relates to an advanced system for and method of tracking and characterizing welding exercises and operations. This system is particularly useful for welding instruction and welder training that provides an affordable tool for measuring manual welding technique and comparing that technique with established procedures. The training applications of this invention include: (i) screening applicant skill levels; (ii) assessing trainee progress over time; (iii) providing real-time coaching to reduce training time and costs; and (iv) periodically re-testing welder skill levels with quantifiable results. Process monitoring and quality control applications include: (i) identification of deviations from preferred conditions in real time; (ii) documenting and tracking compliance with procedures over time; (iii) capturing in-process data for statistical process control purposes (e.g., heat input measurements); and (iv) identifying welders needing additional training. The system of the present invention provides the unique benefit of enabling the determination of compliance with various accepted welding procedures. In other embodiments, tracking data may be used for a variety of process control and/or monitoring functions.

The present invention, in various exemplary embodiments, tracks the motion of multiple elements comprising helmets, torches or guns, and workpieces and gathers process data during welding exercises using a selectable multiple frequency transmitter and one or more multiple frequency receivers in an electromagnetic tracking system. This invention is applicable to a wide range of processes including, but not necessarily limited to, GMAW, FCAW, SMAW, GTAW, and cutting. The invention is expandable to a range of work-piece configurations, including large sizes, various joint type, pipe, plate, and complex shapes. Measured parameters include work angle, travel angle, tool standoff, travel speed, bead placement, weave, voltage, current, wire feed speed, and arc length. The training component of the present invention may be pre-populated with specific welding procedures or it may be customized by an instructor. Data can be automatically saved and recorded, a post-weld analysis scores performance, and progress tracked over time. This system may be used throughout an entire welding training program and may include both in-helmet and on-screen feedback. With reference now to the Figures, one or more specific embodiments of this invention shall be described in greater detail.

In another exemplary embodiment, the plurality of position and orientation characteristics associated with the manipulation of the welding gun may be shown on one or more displays, such as a computer monitor or a television, and may be illustrated in a graphical format. Regardless of whether an actual power source or a virtual power source is utilized, the method may also include the step of displaying at least one of the plurality of arc parameters or the arc length (AL). The plurality of arc parameters or the arc length (AL) may be shown on one or more displays.

In yet another embodiment, the method includes the steps of: (a) storing the plurality of position and orientation characteristics calculated during welding; and (b) comparing the stored plurality of position and orientation characteristics calculated during welding to a plurality of predefined acceptance limits of position and orientation characteristics to ensure quality control, or even to validate the weld. In this embodiment, the processor includes storage means, such as a data folder on a computer hard drive. The storage means may also include the plurality of predefined acceptance limits of position and orientation characteristics. The predefined acceptance limits of position and orientation characteristics may correspond to established standard operating procedures for different types of welds and weld joints.

In another exemplary embodiment, the method includes the step of providing real-time feedback during welding.

In another exemplary embodiment, the method comprises steps for detecting potential sources of electromagnetic interference and indicating that there is potential interference, recommend a frequency and/or sensor change, and/or automatically change the selected frequencies accordingly.

In another exemplary embodiment, the method comprises comparing the output of an electromagnetic sensor to the output of an accelerometer and providing an alert if there is a difference in the position or movement detected.

In another exemplary embodiment, the method comprises receiving a user selection of a transmission frequency and providing that frequency information to a transmitter and receiver.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concept will become better understood with regard to the following description and accompanying drawings in which.

DETAILED DESCRIPTION

Figure 1:
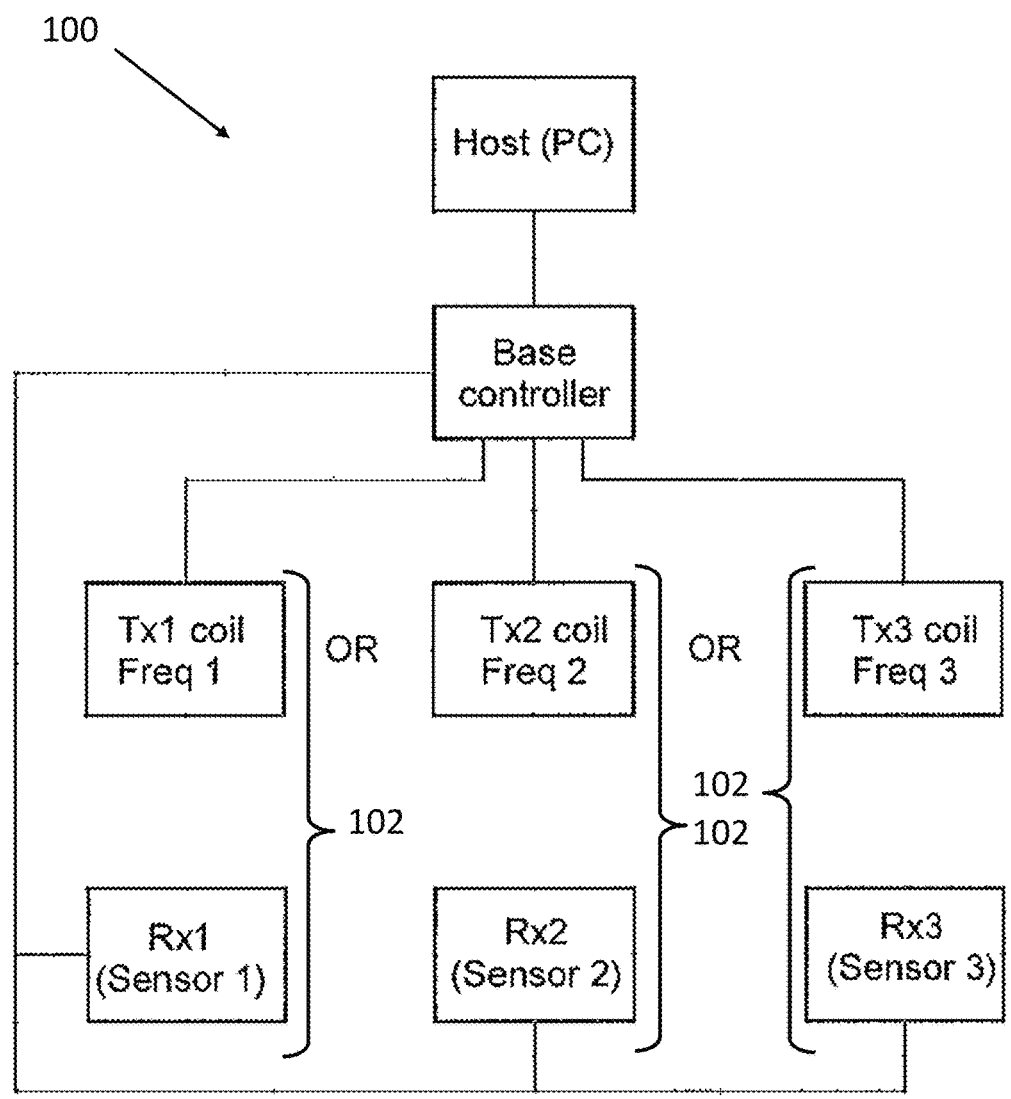
FIG. 1 is a diagram illustrating a known embodiment of an electromagnetic tracking system.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Electromagnetic tracking systems may be used to track torch or tool motion during real or simulated welding exercises. In addition to torch motion, such electromagnetic tracking systems may be used to track the position and orientation of other components during such welding exercises. As such, a system may comprise multiple receivers, with each receiver being associated with a particular component. For example, a first receiver is associated with a torch, a second receiver is associated with a helmet, and a third sensor may be associated with a workpiece.

Electromagnetic tracking systems work on a specific frequency. That is, a transmitter transmits an electromagnetic signal at a specific frequency and receivers are calibrated to receive that specific frequency and ignore other frequencies. For multiple systems to work in proximity, multiple frequencies are required to avoid interference with other systems. Thus, there is a need for unique individual operating frequencies for each system. In some embodiments, this is accomplished by a multi-frequency transmitter combined with sensors where each sensor is configured to receive different frequencies. In other embodiments, a transmitter may transmit a signal to a transmitter and associated receivers operating at the same frequencies.

In addition to interference caused by adjacent systems, arcing and other welding operations can generate electromagnetic interference which may interfere the receivers of electromagnetic tracking systems. In order to be applicable to monitor actual welding operations or to monitor simulating welding operations where such simulation takes place in proximity to an actual welding operation, embodiments of the invention may require the capability to change the frequencies used by the transmitter and receivers in order to avoid adjacent system or arcing and other welding operation interference.

As shown in FIG. 1 at 100, current tracking technology utilizes transmitter and sensor pairs 102 (Tx1/Rx1, Tx2/Rx2, and Tx3/Rx3) with dedicated frequencies (Freq 1, Freq 2, and Freq 3, respectively). In many cases, limited numbers (e.g., up to 3) of transmitter and sensor pairs 102 can be supported, which limits the expansion of training platforms (e.g., Lincoln Electric's Vrtex system) that require multiple stations (e.g., a GTAW system). The illustrated system uses individual dedicated transmitter coils to support unique frequencies so that multiple systems (e.g., Vrtex) can operate without interference in close proximity.

Figure 2:
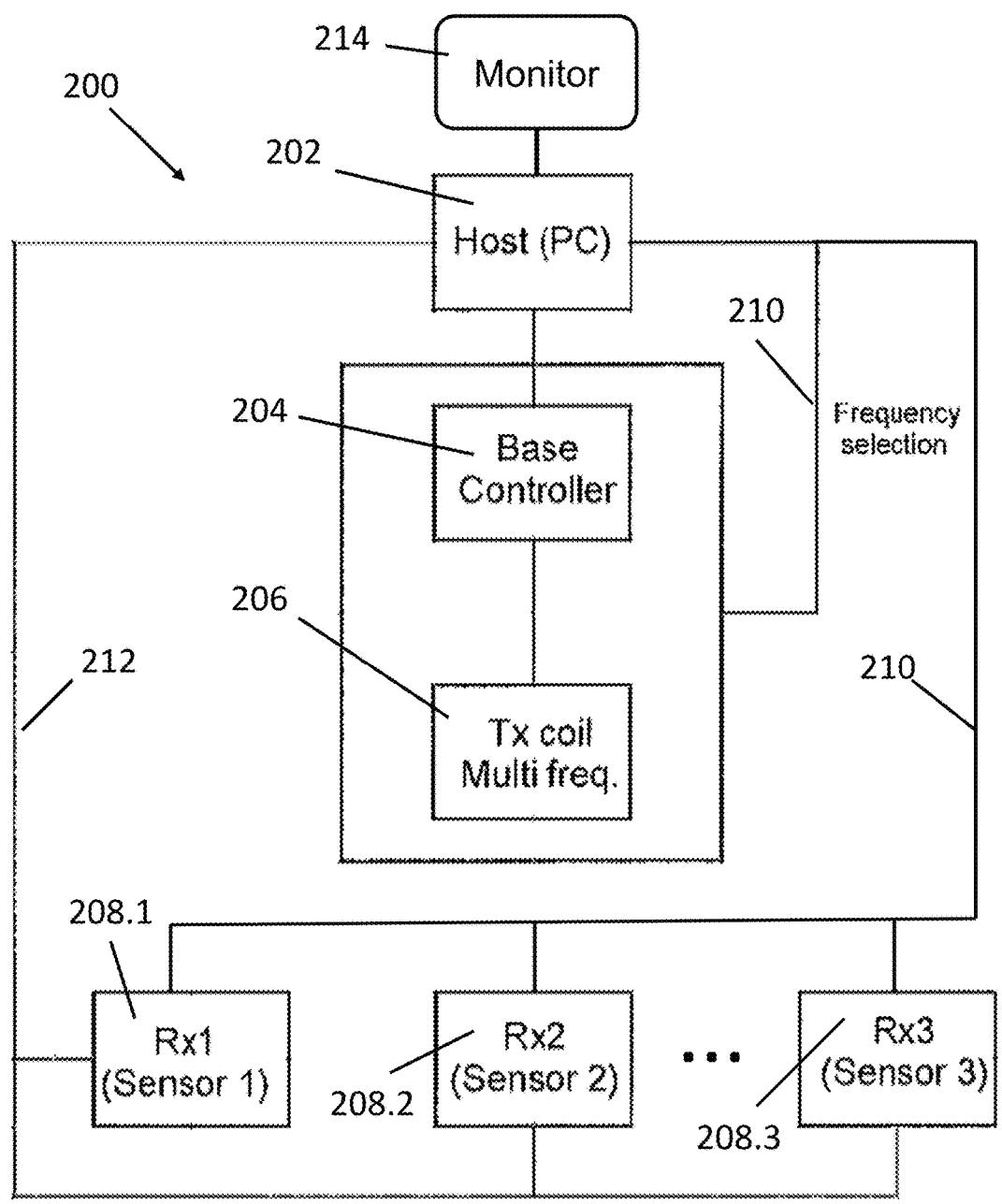
FIG. 2 is a diagram of an electromagnetic tracking system according to an exemplary embodiment.

In FIG. 2, an exemplary embodiment is illustrated that comprises a variable and/or multiple frequency transmitter tracking system 200. The system 200 comprises a host 202, a base controller 204, a transmitter 206, and a plurality of sensors 208.1, 208.2, and 208.3. In the exemplary embodiment illustrated, the system 200 can selectively control frequencies via use of one transmitter 206. The system 200 utilizes a transmitter 206 that can be configured to broadcast multiple selectable frequencies to sensors 208.1, 208.2, and 208.3, where each sensor can then be configured to discern a selected unique frequency. With this system, the base controller 204 can support multiple frequencies without the need for multiple transmitters. This eliminates the need for various dedicated transmitter coils and receivers and reduces the need for multiple frequency systems (e.g. Vrtex). In such an embodiment, the communication of the selected frequency is done via a frequency selection communication bus 210. This frequency selection communication bus 210 is in communication with both the base controller 204 and sensors 208.1, 208.2, and 208.3.

In an alternate exemplary embodiment, the transmitter 206 can be configured to transmit a selectable frequency to sensors 208.1, 208.2, and 208.3. In such an embodiment, each of the sensors 208.1, 208.2, and 208.3 receives and utilizes the selected frequency broadcast by the transmitter 206. Such an embodiment may be configured to support a number of sensors without the transmitter 206 having to transmit a unique frequency for each sensor.

The sensors 208.1, 208.2, and 208.3 communicate position and/or orientation data to the base controller 204 directly over signal lines 212 (e.g., USB, which is a commonly used communications configuration and protocol). In certain exemplary embodiments, the frequency selection communication bus 210 and the signal lines 212 may be the same physical communication connection.

In other exemplary embodiments, wireless technology may be utilized to communicate both position and orientation information from the sensors 208.1, 208.2, and 208.3 and also frequency selection to the base controller 204 and/or the sensors. Wireless technology may enable a more realistic user experience in that items that a user is expected to manipulate or otherwise come into contact with (i.e., torches and eye protection) may be fabricated without additional communication lines (210 and 212).

Figure 3:
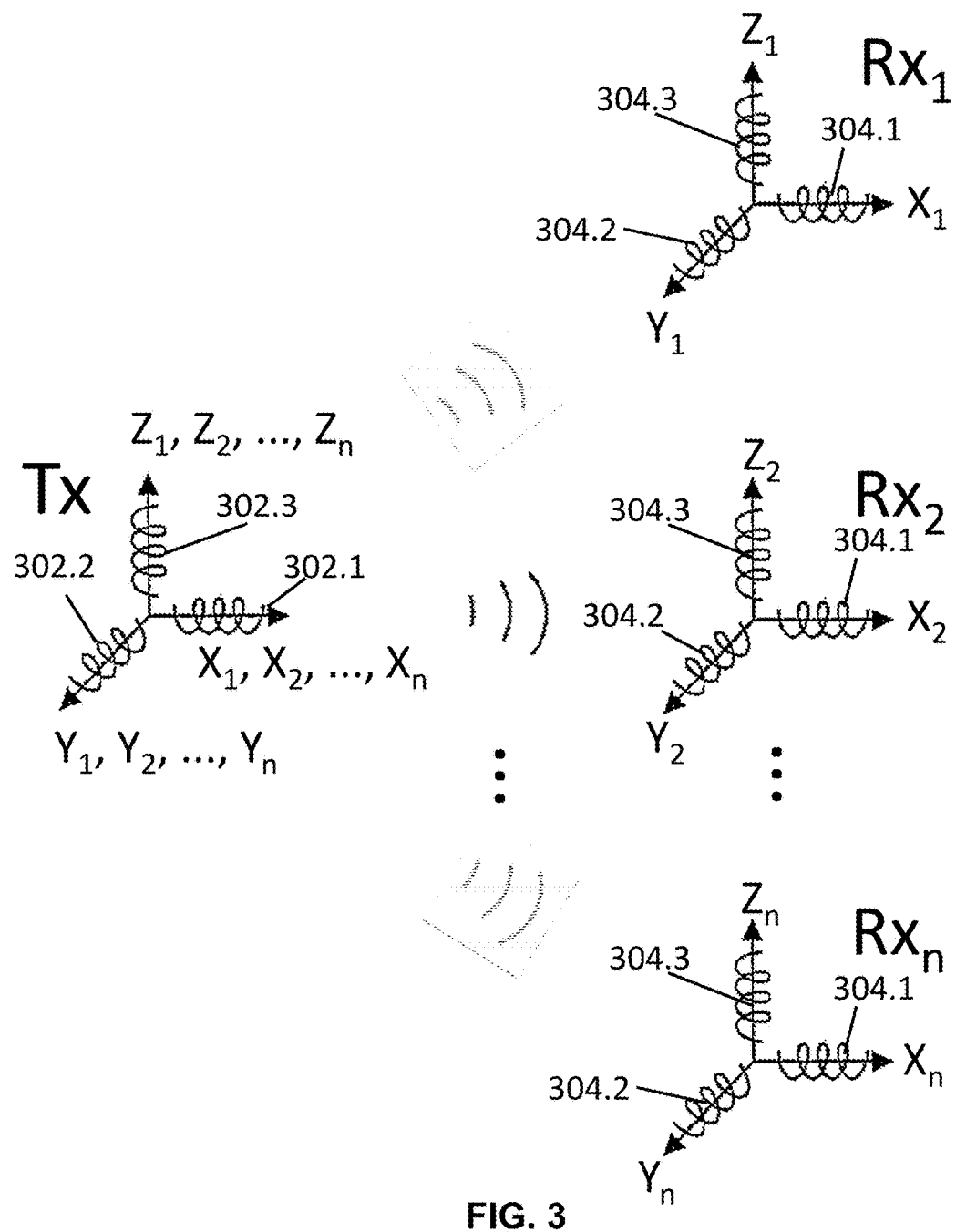
FIG. 3 is a diagram of transmission and reception coils used in an exemplary embodiment.

FIG. 3 shows one embodiment of transmission and reception coils used in a multiple frequency transmitter 206 and a plurality of sensors 208.1, 208.2, and 208.3 according to an exemplary embodiment. While not illustrated in FIG. 3, the transmitter 206 comprises electronic components that receive a selected frequency and provide signals that stimulate transmission coils. In an exemplary embodiment, the transmitter 206 and sensors 208.1, 208.2, and 208.3 each have three coils configured along three orthogonal axes, X, Y, and Z. In one embodiment, shown in FIG. 3, the transmitter 206 includes the transmitting coils 302.1, 302.2, and 302.3 broadcasts signals at three slightly different but unique frequencies that are based upon the selected frequency (frequency group). These received signals are unique with respect to each coil in both frequency and also the orientation of the signal generated by the transmitting coils as the result of the physical arrangement along three orthogonal axes of those transmission coils. Because of unique frequency of each coil, a frequency group refers to these individual frequencies as slight variations of a frequency upon which the group is based. For example, a frequency group based on 24 kHz (24,000 Hz) may comprise three individual frequencies of 24 kHz, 25.92 kHz, and 27.84 kHz. One of ordinary skill in the art will appreciate that the actual frequencies used are dependent upon the transmitter 206 and receiver hardware configurations and that the example frequencies are not intended to limit the scope of the invention. Each sensor comprises three receiving coils 304.1, 304.2, and 304.3 which are configured to receive the signals broadcast by the corresponding X, Y, and Z transmitting coils 302.1, 302.2, and 302.3.

Thus, in certain embodiments of the invention, one transmitter can be configured to broadcast unique signals to multiple receivers in parallel using unique frequencies for each receiver/sensor without the need for a dedicated transmitter for each receiver. In other embodiments, the transmitter is configured to transmit signals to multiple receivers in parallel using a common group of frequencies for all receivers/sensors.

Regardless of whether the signal received by the receivers is unique to each receiver or common to all receivers, the signals received by the three receiving coils 304.1, 304.2, and 304.3 in each receiver are then analyzed to determine where receiver coils are located spatially in relation to the one set of transmitting coils. In some exemplary embodiments, the signals received by the receiving coils are analyzed at the sensor 208.1, 208.2, and 208.3 corresponding to the coils 304.1, 304.2, and 304.3. In other embodiments, this analysis can be performed at the host 202 or some other processor. In certain exemplary embodiments, other types of frequency dependent sensors, including those with other coil arrangements, could also be used.

Analyzing the signals received by the orthogonal axes coils described herein can be used to determine a position of each receiving coil (receiver) relative to the corresponding transmitting coil (transmitter). However, in certain embodiments of the invention, additional sensors such as an accelerometer may be included in the sensors 208.1, 208.2, and 208.3. The addition of such additional sensors can provide improved accuracy with regard to position and orientation relative to the transmitter 206.

The disclosed position sensing technology can be applied to various welding exercises. For example, with general reference to FIGS. 4-5, a system 400 for tracking and characterizing the creation of a manual weld is illustrated. The system 400 generally includes a welding gun 402 and a controller 412. The system 400 has a number of applications, including but not limited to, welding, welding training, "dry-run" welding training, process monitoring, process control, correlation to mechanical properties to reduce or eliminate destructive testing, and real-time feedback while creating a manual weld. Thus, references herein to the "welding" of various work pieces includes actual welding, simulated welding, training welding, and "dry-run" welding; in other words, one with skill in the art will appreciate that the physical joining of work pieces is not actually required. Likewise, the disclosure herein is meant to include brazing and soldering operations, and the training of brazing and soldering techniques. The present disclosure includes all continuous manual (and semi-automatic) processes in which the tracking of position and orientation of a work implement is important from a monitoring, quality, and/or training, perspective. Furthermore, the system 400 is applicable to all types of manual welding processes. Each of the components of the system 400, as well as a method for using the system 400, will be discussed in detail below.

Figure 4:
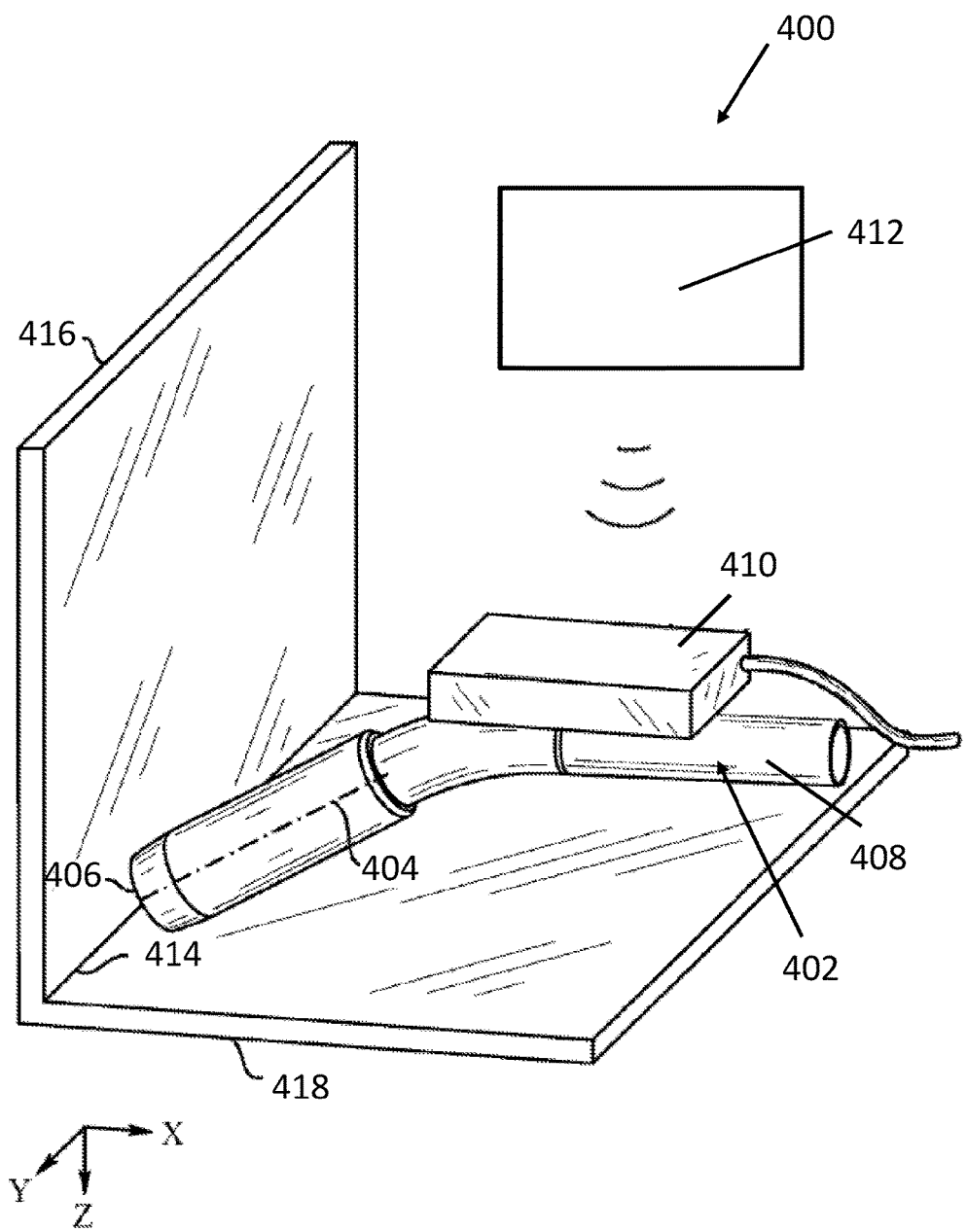
FIG. 4 is an illustration of an exemplary embodiment applied to of a welding gun to track its position relative to a workpiece.
Figure 5:
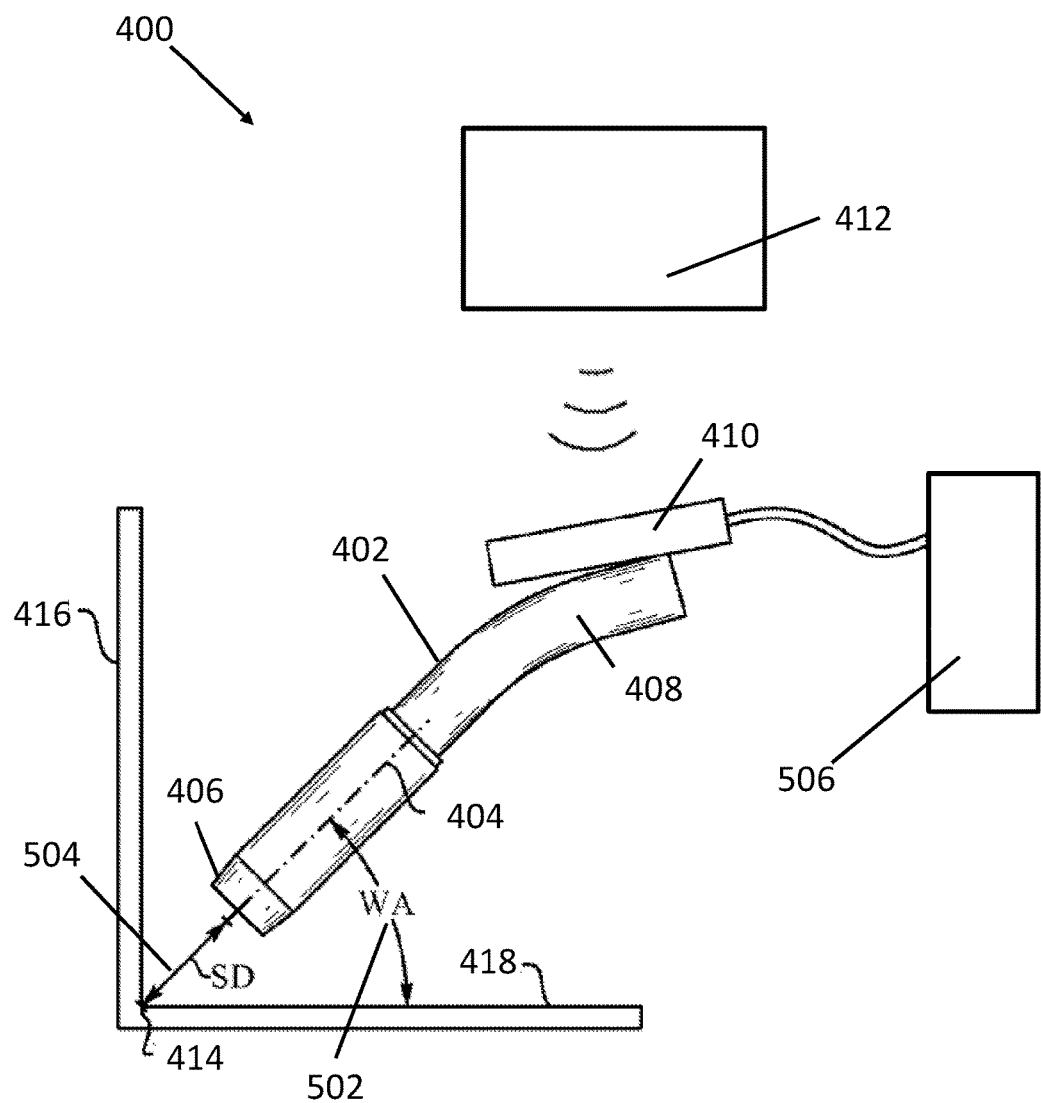
FIG. 5 is an alternate view of an exemplary embodiment applied to of a welding gun to track its position relative to a workpiece.

Referring still to FIGS. 4-5, a welding gun 402 is shown in proximity to a weld joint 414 defined by a first work piece 416 and a second work piece 418. The welding gun 402 has a gun axis 404, a gun tip 406, a handle 408, and a sensor device 410. As used throughout this detailed description, the term welding gun 402 includes welding torches and welding electrode holders for both consumable and non-consumable electrodes. For example, in a shielded metal arc welding process (SMAW), the welding gun 402 would refer to the electrode holder and the gun tip 406 would refer to the consumable electrode. As seen in FIGS. 4-5, the gun axis 404 is an imaginary line extending through the center of the welding gun 402. For many types of welding guns 402 the gun axis 404 will coincide with the gun tip 406.

As seen in FIGS. 4-5, in one embodiment, the sensor device 410 is mounted on the welding gun 402. However, one with skill in the art will appreciate that the sensor device 410 could be integral to the welding gun 402. By way of example only, and not limitation, the sensor device 410 may be built into the handle 408 or near the gun axis 404. The sensor device 410 utilized will be specified according to the tracking system. In the illustrated exemplary embodiment, the sensor device 410 includes an electromagnetic sensor, such as, for example, one of sensors 208.1, 208.2, and 208.3 described above. The orientation and/or position of the axes X, Y, and Z of the sensor device 410 can be associated and/or calibrated with the gun axis 404 so that sensor signals indicative of the position and/or orientation of the sensors 208.1, 208.2, or 208.3, indicate or can be used to determine the position and/or orientation of the welding gun 402 and/or its components (e.g., gun tip 406).

Referring still to FIGS. 4-5, the system 400 includes controller 412 remotely positioned from the welding gun 402 to broadcast signals for tracking the sensor 410 as the welding gun 402 traverses the weld joint 414 while making a weld. In this embodiment, the controller 412 includes an electromagnetic transmitter, such as, for example, transmitter 206 described above.

Figure 6:
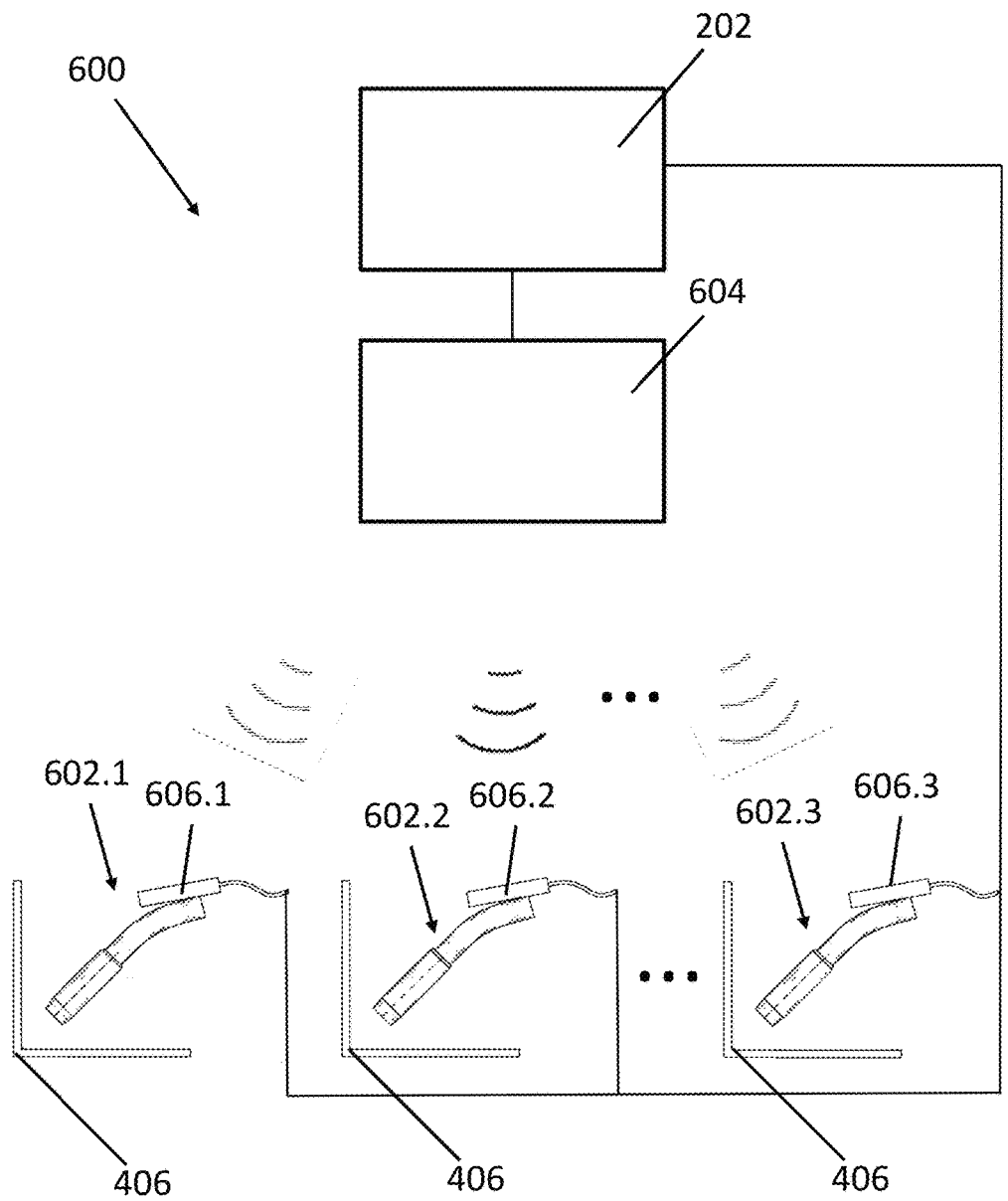
FIG. 6 is an illustration of an exemplary embodiment applied to a plurality of devices to sense their position.

As shown in FIG. 6, an exemplary embodiment of the invention is comprised by system 600 which includes welding guns 602.1, 602.2, and 602.3 and a host 202 (e.g., a tracking processor in a host PC) in communication with the controller 604. Each of the welding guns 602.1, 602.2, and 602.3 include a sensor device 606.1, 606.2, or 606.3, as described above. In the illustrated exemplary embodiment, the controller 604 includes an electromagnetic transmitter, such as, for example, transmitter 206 described above. The host 202 can analyze and process the plurality of signals from the sensor devices 606.1, 606.2, and 606.3 and calculate a plurality of position and orientation characteristics associated with the welding guns 602.1, 602.2, and 602.3. Although the term host 202 is used singularly throughout this description, the host 202 may include multiple components, such as multiple computers and software programs, which may be located remotely.

In an exemplary embodiment, a user can interface with the host 202 via a user interface (including, e.g., a display) to determine the broadcast frequencies for each of the sensor devices 606.1, 606.2, and 606.3. In one exemplary embodiment, transmitter and receiver frequencies are both variable and are established together, including, in some embodiments, establishing those frequencies based on potential interference. In various embodiments, transmitter and receiver frequencies may be selectable from pre-defined or dedicated frequencies, including, for example, frequency ranges determined by the hardware of the receivers. In other embodiments, transmitter and receiver frequencies may be variable. Although these frequencies may be selected and/or changed by software, they may also be selectable via hardware adjustment (e.g., dip switches).

In one particular embodiment, the host 202 includes a computer running a program/algorithm to process the plurality of signals from the sensor devices sensor devices 606.1, 606.2, and 606.3 to generate raw distance and position data associated with the sensor devices relative to the transmitter 206 and a conversion program to transform the raw distance and position data into a plurality of position and orientation characteristics associated with the welding guns 602.1, 602.2, and 602.3. In another embodiment, the host 202 may comprise two computers, with a first computer running the tracking program to generate the raw distance and position data associated with the sensor devices 606.1, 606.2, and 606.3, and a second computer in communication with the first computer that runs the conversion program to transform the raw distance and position data into a plurality of position and orientation characteristics associated with the welding guns 602.1, 602.2, and 602.3. The program may be virtually any program that is capable of providing accurate distance and position measurements in 3-dimensional space. Notably, the program can track and measure movements along an X-axis, a Y-axis, and a Z-axis, as well as the ability to track and measure roll, pitch, and yaw rotations, via the use of other sensors, such as, but not limited to accelerometers, alone or in combination.

In order to achieve a position accuracy suitable to simulate a welding operation or to capture the position of welding apparatus in an actual welding operation, it is generally desirable to calibrate the sensor devices 606.1, 606.2, and 606.3 relative to the transmitter 206. In some exemplary embodiments, the tracking system 200 can also have a set of hard-coded calibration coordinates, which determine position of the trackers in spatial coordinates. A problem with current technology is trackers that require calibration to be manually adjusted every time a new system is built (i.e., sensor coils have to be manually calibrated to a transmitter coil once a system has been assembled).

In an exemplary embodiment, for the tracking system 600 to accurately track and measure the position and movement of the sensor devices 606.1, 606.2, and 606.3, the tracking system 600 must first learn the parameters of a sensor device 606.1, which will then become the "taught object." The program transforms the raw data into weld parameters to relate the "taught object" position to the weld joint 414 position and orientation as well as the position and orientation on the welding guns 602.1. As such, a calibration process may be performed. The calibration process can serve to zero the positioning of the sensor device 606.1 to create a frame of reference that allows the program to accurately calculate the distance and position data associated with the sensor device 606.1 when an actual run is performed. For example, a calibration fixture may be utilized to hold the welding gun 602.1, and thus the sensor device 606.1, in a known position and orientation relative to the controller 604. The calibration process may also be used to register the position of the work piece(s) relative to the system 600.

Figure 7:
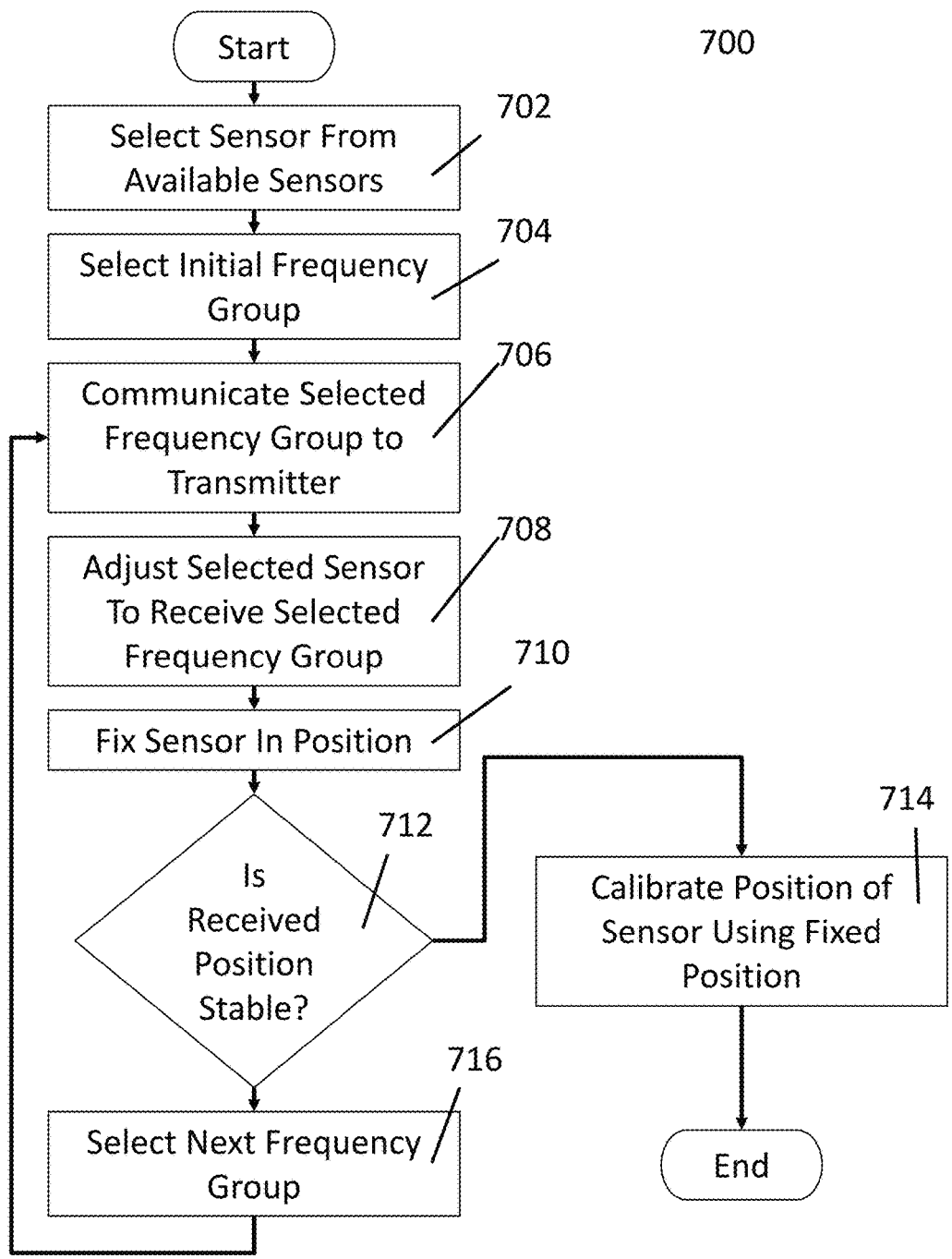
FIG. 7 is a flowchart illustrating the steps to calibrate a sensor according to an exemplary embodiment of the invention.

As illustrated in the flowchart 700 of the exemplary embodiment shown in FIG. 7, a sensor for calibration may be selected 702. An initial frequency group is selected 704 and communicated to the transmitter 206. The selected sensor is then adjusted 708 to receive the appropriate frequencies of the frequency group. In step 710, the sensor is fixed at a known position relative to the transmitter 206. If the data received by the controller 604 indicates that the detected position is stable 712, the selected sensor is calibrated 714 such that the data representing the position of the selected sensor is made equivalent to the actual fixed position of the sensor. However, if the data received by the host 202 indicates that the sensor position is not stable, a different frequency group is selected at step 716. Once each sensor has been calibrated, a user may then initialize the controller 604 and host 202 to begin collecting the raw distance and position data associated with the sensor device 606.1. Next, the user may proceed to make a trial run along the weld joint 414 to begin collecting data. In making the trial run, the user may create an actual weld or simply perform a "dry run" without actually welding. When the trial run process is complete, the user will terminate the data collection process.

In an exemplary embodiment, the plurality of position and orientation characteristics associated with the welding gun 602.1 may include at least one of the following characteristics: a work angle (WA), a travel angle (TA), a standoff distance (SD), a travel speed (TS), and a weave pattern (WP). These characteristics can substantially affect the quality, appearance, and properties of various types of welds.

One with skill in the art will be familiar with the above-mentioned characteristics; however, an explanation of each will now be given. Referring to FIG. 5, the work angle (WA) 502 of the welding gun 402 is shown. The work angle (WA) 502 is the angle of the welding gun 402 with respect to the base work piece 418. Stated another way, the work angle (WA) 502 is the angle at which the gun tip 406 is pointed at the weld joint 414 measured from the base work piece 418. For example, when the weld joint 414 is a lap joint or a T-joint, the work angle (WA) 502 should be about 45 degrees, whereas for a butt joint the work angle (WA) should be about 90 degrees. Thus, as seen in FIG. 5, for making a fillet weld on a first work piece 416 and a second work piece 418 of equal thickness, the work angle (WA) 502 should be approximately 45 degrees. In multiple-pass fillet welding, the work angle (WA) 502 is important. For instance, when undercuts develop in the vertical section of the fillet weld, the work angle (WA) 502 often should be adjusted such that the gun tip 406 is directed more toward the vertical section. The travel angle (TA) (not shown) is the angle of the welding gun 408 measured from the vertical in the direction of welding. The travel angle (TA) is also commonly referred to as the torch angle. In typical welding processes the travel angle (TA) is between about 5 and 25 degrees. Furthermore, the travel angle (TA) may be a push angle or a pull angle. Referring again to FIG. 5, the standoff distance (SD) 504 is defined by the distance between the welding gun tip 406 and the weld joint 414. The standoff distance 504 is also commonly referred to as the contact tip-to-work distance. Variation in the standoff distance 504 can affect the creation of the weld. For example, a standoff distance 504 that is too short can lead to an increase in the weld heat, greater penetration, and a decrease in weld buildup. On the other hand, a standoff distance 504 that is too long can result in a reduction in weld heat, penetration, and fusion, as well as an undesirable increase in weld buildup. As its name suggests, travel speed (TS) (not shown) refers to the speed at which the welding gun 402, specifically the gun tip 406, travels along the weld joint 414 when welding. The travel speed (TS) can affect the size, shape, and integrity of a weld. The weave pattern (WP) (not shown) refers to the pattern in which a welder manipulates the welding gun 402, and hence the gun tip 406, when creating a weld and can affect several weld properties. For example, the weave pattern (WP) influences penetration, buildup, width, and integrity of the weld. In exemplary embodiments, a welding power source is in communication with the host 202. In such embodiments, the host 202 receives data corresponding to welding parameters, namely, the welding current (I), the welding voltage (V), and the wire feed speed (WFS) during the creation of a weld. After receiving the welding current (I), welding voltage (V), and wire feed speed (WFS) data, the host 202 may calculate an arc length (AL) using mathematical operations known to those with skill in the art.

Exemplary embodiments may include a display. As is illustrated in the exemplary embodiment of FIG. 2, a display 214 can be in communication with the host 202 and is configured to act as a user interface for selecting transmitter frequencies and/or illustrate at least one of the plurality of position and orientation characteristics of a sensor 208.1, 208.2, or 208.3. By way of example, and not limitation, the display 214 may be a standard computer monitor that is capable of receiving and displaying the data output from the host 202. Further, the display 214 may be incorporated into a welder's helmet, goggles, gloves, or may be projected onto the work pieces 416 and 418. The system 200 may include more than one display 214. The display 214 can illustrate at least one of the plurality of position and orientation characteristics of the welding gun 402 during creation of a weld, or even in a "dry-run" scenario where the welding gun 402 is manipulated, but no weld is made. Thus, the display 214 serves as a tool for providing visual feedback of the position and orientation characteristics of the welding gun 402. In an exemplary embodiment, the plurality of position and orientation characteristics of the welding gun 402 are shown on the display in a graphical format. The display may also provide visual feedback corresponding to the plurality of welding parameters during the welding process. As would be understood by one of ordinary skill in the art, the described transmitter 206 and sensors 208.1, 208.2, and 208.3 may be used to monitor the various parameters noted herein while they are demonstrated by a user of the welding gun.

Figure 8:
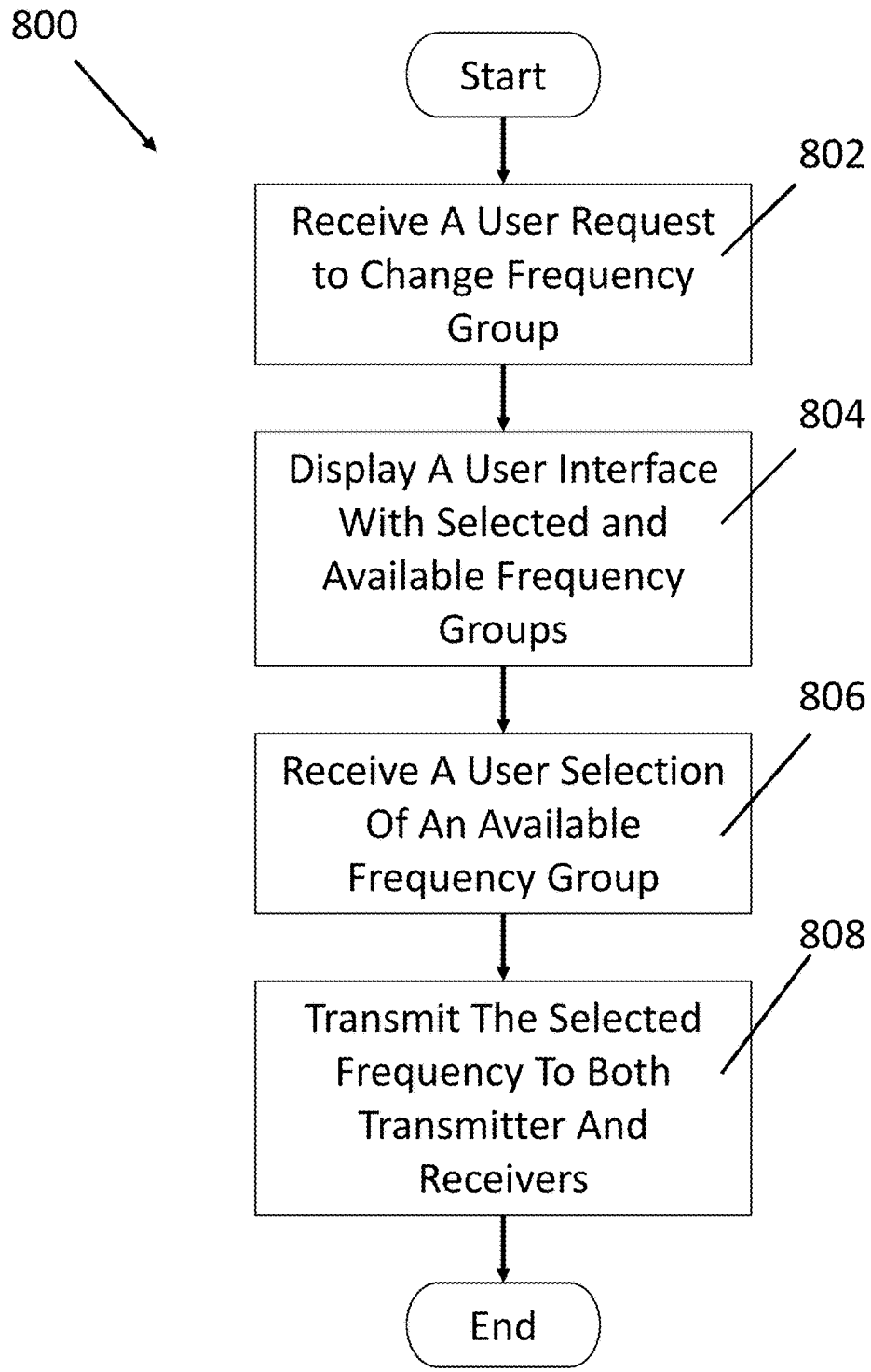
FIG. 8 is a flowchart illustrating the steps to select a frequency group used by the transmitter and receivers according to an exemplary embodiment of the invention.
Figure 9:
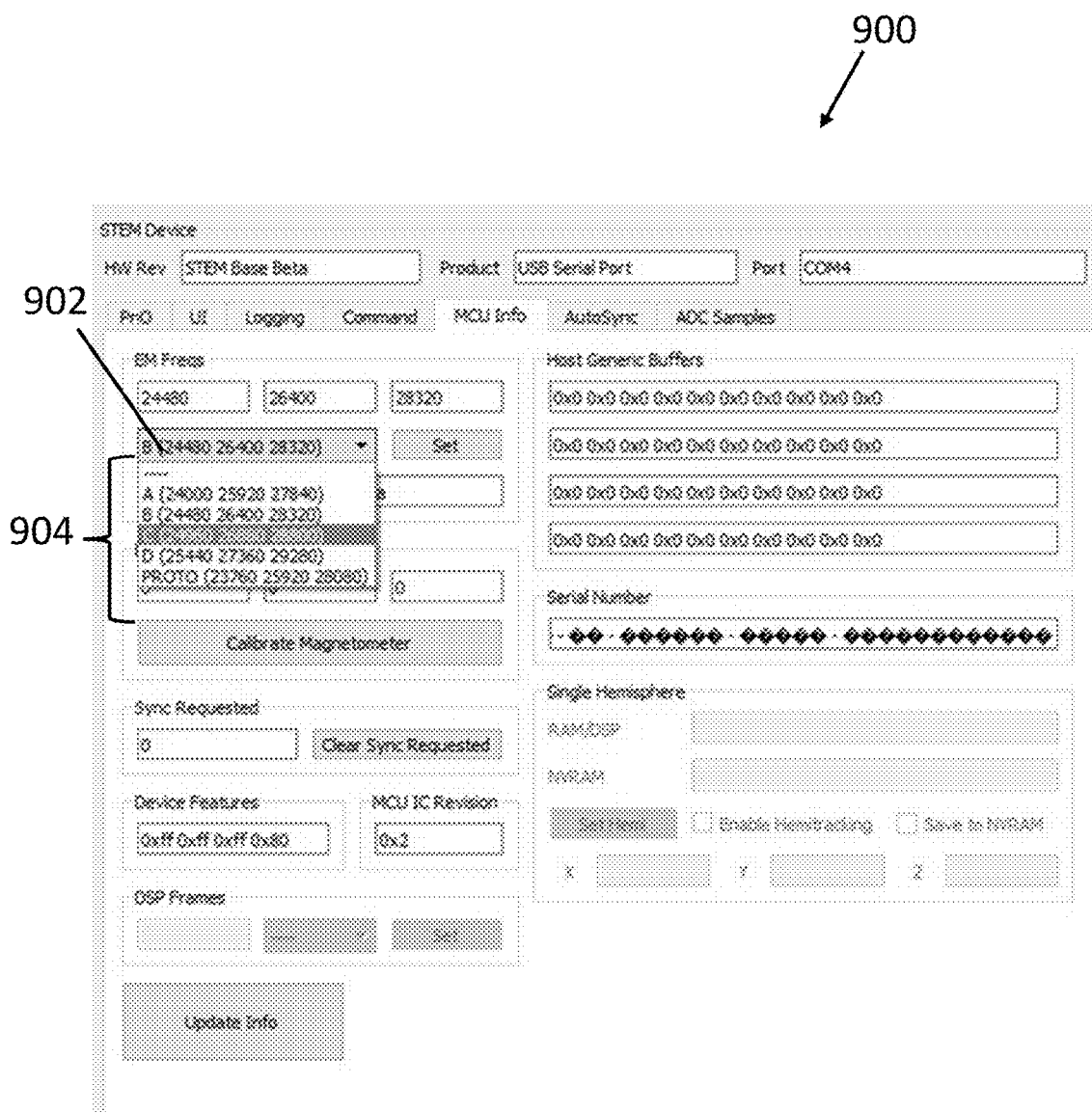
FIG. 9 is a user interface according to an exemplary embodiment.

In exemplary embodiments, the determination of frequencies used by the transmitter 206 and sensors 208.1, 208.2, and 208.3. may be selections from a user or may be an automatic determination by the system. For example, in the exemplary embodiment illustrated by the flowchart 800 of FIG. 8, a user may initiate a frequency change by selecting a control on the system 200 or via a user interface in step 802. A user interface may then display the currently selected frequency group and those frequency groups available for selection 804. In step 806, the system receives a user selection of a frequency group and transmits those frequencies to both the transmitter 206 and sensors 208.1, 208.2, or 208.3 in step 808. An exemplary embodiment of such a user interface 900 is illustrated in FIG. 9. As shown, the user interface 900 comprises a display of the current frequency group 902, and a listing of those groups available for selection 904. Thus, a user of such a user interface may select one of the available frequency groups.

In certain exemplary embodiments, the selection, determination, and/or programming of frequencies can be achieved through simulation and control software. For example, a user can select frequencies in a user interface of a simulation and control software program in order to avoid interference between various adjacent tracking systems 200, each of which comprise a transmitter 206 and sensors 208.1, 208.2, and 208.3. In some exemplary embodiments, such a selection can be performed to avoid interference from other electromagnetic sources near the tracking system 200. In some exemplary embodiments, this can be achieved by interfacing application program interface (API) software of the tracking technology to the simulation and control software program. In an exemplary embodiment of the invention, the system 200 may detect potential sources of electromagnetic interference and determine the selected frequencies accordingly. This detection process may be automatic as the result of communication between the system 200 and potential sources of electromagnetic interference or may be the result of a user providing data that identifies the potential sources of electromagnetic interference.

Figure 10:
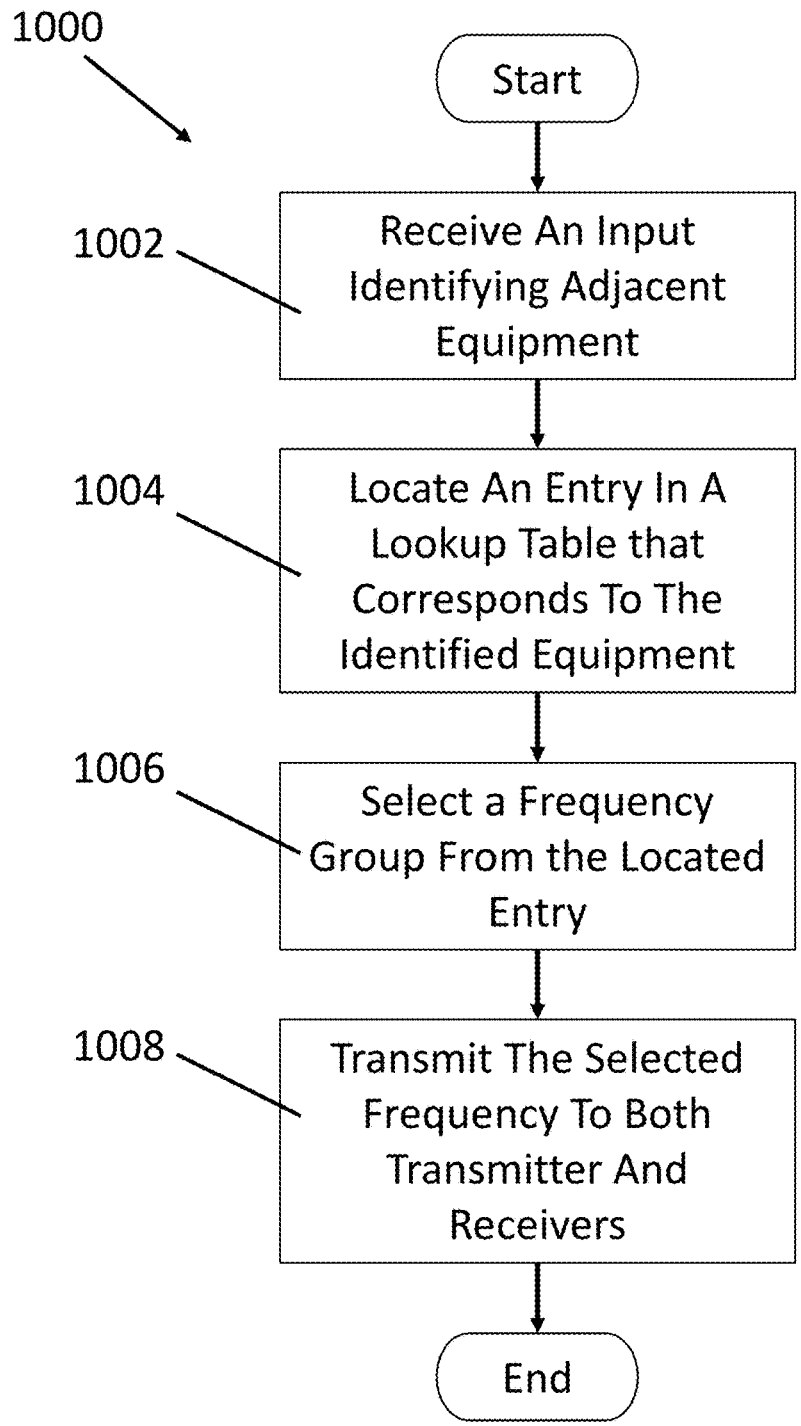
FIG. 10 is a flowchart illustrating the steps performed by an exemplary embodiment to select a frequency group in order to minimize interference by adjacent pieces of equipment.

FIG. 10 comprises a flowchart 1000 that illustrates the steps of such an exemplary embodiment. In step 1002, an input is received that comprises data identifying potential sources of electromagnetic interference. The system 200 uses that data to reference a table of interference sources and corresponding suggested frequencies to best overcome those sources in step 1004. In step 1006, the system 200 then selects a frequency from the table that is likely to result in a lesser amount of interference from the potential sources of electromagnetic interference. In certain exemplary embodiments, the selected frequency is communicated to the transmitter 206 and sensors 208.1, 208.2, or 208.3 in step 1008. In other exemplary embodiments, the selected frequency is communicated to the transmitter 206 and a first sensor 208.1. In such an embodiment, the process is repeated and a second selected frequency is communicated to the transmitter 206 and a second sensor 208.2. In such embodiments, this process is repeated until all sensors have been assigned a selected frequency. In some exemplary embodiments, this step may also include selecting or adjusting the configuration of the sensors based on the selected frequencies.

In various other embodiments, location, position, and/or orientation characteristics may be used in combination with other technologies, including, for example, weld sequencer applications. The weld sequencer technology described in U.S. Pat. No. 8,692,157 (Ser. No. 11/227,349), U.S. Pat. No. 9,104,195 (Ser. No. 11/613,652), US Pub. No. 2014/0042135 (Ser. No. 13/802,985), US Pub. No. 2014/0042136 (Ser. No. 13/803,032), US Pub. No. 2014/0042137 (Ser. No. 13/803,077), US Pub. No. 2014/0263225 (Ser. No. 13/802,883), US Pub. No. 2014/0263227 (Ser. No. 13/802,951), US Pub. No. 2015/0268663 (Ser. No. 14/730,991), and US Pub. No. 2016/0361774 (Ser. No. 13/802,918) are hereby incorporated by reference in their entirety.

In still other various embodiments, location, position, and/or orientation characteristics may be used in combination with other technologies, including applications that disclose weld sequencer editors and limits analyzers. The weld sequencer editor and limits analyzers described in US Pub. No. 2015/0069029 (Ser. No. 14/132,496), and US Pub. No. 2017/0189984 (Ser. No. 15/014,965) are hereby incorporated by reference in their entirety.

The tracking methods and systems described herein may be utilized by a welding system that include weld sequencers, weld sequencer editors, or limits analyzers. For example, these systems may include various components that may utilize location, position and/or orientation information. In some embodiments, for example, a check point component may monitor a welding process and/or a welding operator, including a movement of an operator, a position of a welding tool, a position or location of a welding equipment, a position or location of an operator, and the like. In other embodiments, for example, a collection component may collect real time data from a welding operation that uses a welding sequence, including a movement of an operator, a position of a welding tool, a position or location of a welding equipment, a position or location of an operator, a location or position of a body part of an operator, a fixture location, a speed for a welding tool, among others. In other embodiments, other components may utilize similar information, including guide components, monitor components, etc.

In addition to weld sequencing, the disclosed location, position, and/or orientation characteristics may be used in combination with other technology, including virtual reality technologies as described in US Pub. No. 2015/0125836 (Ser. No. 14/527,914), and US Pub. No. 2017/0053557 (Ser. No. 14/829,161). Thus, these publications are also hereby incorporated by reference in their entirety.

The tracking methods and systems described herein may be utilized by virtual reality systems used to simulate welding or augmented reality systems in which information is provided to augment a user's view of an actual welding operation. In some exemplary embodiments, tracking methods and systems may be used to orient and display illustrations of welding tools and the assembly to be welded in a simulated welding operation. In other embodiments, the power source of a welding device may be varied using the image data received from image capture and position sensing devices during a welding operation.

While electromagnetic tracking systems can provide the accuracy needed to perform the functions described herein without the need for line-of-sight required by optical systems, electromagnetic tracking systems can be susceptible to electromagnetic interference from various sources. In addition to interference, electromagnetic tracking systems can also be effected by the distance between a transmitter 206 and sensor 208.1, 208.2, or 208.3. In exemplary embodiments, such effects can manifest themselves as an oscillation in the calculated position of a sensor 208.1, 208.2, or 208.3. In exemplary embodiments in which the sensors 208.1, 208.2, or 208.3 are configured to comprise an accelerometer or similar auxiliary motion sensing technology. In such embodiments, the host 202 can compare the electromagnetic tracking information with that received from the auxiliary motion sensing technology in order to determine if measured movement is actual movement or the result of interference or distance.

Figure 11:
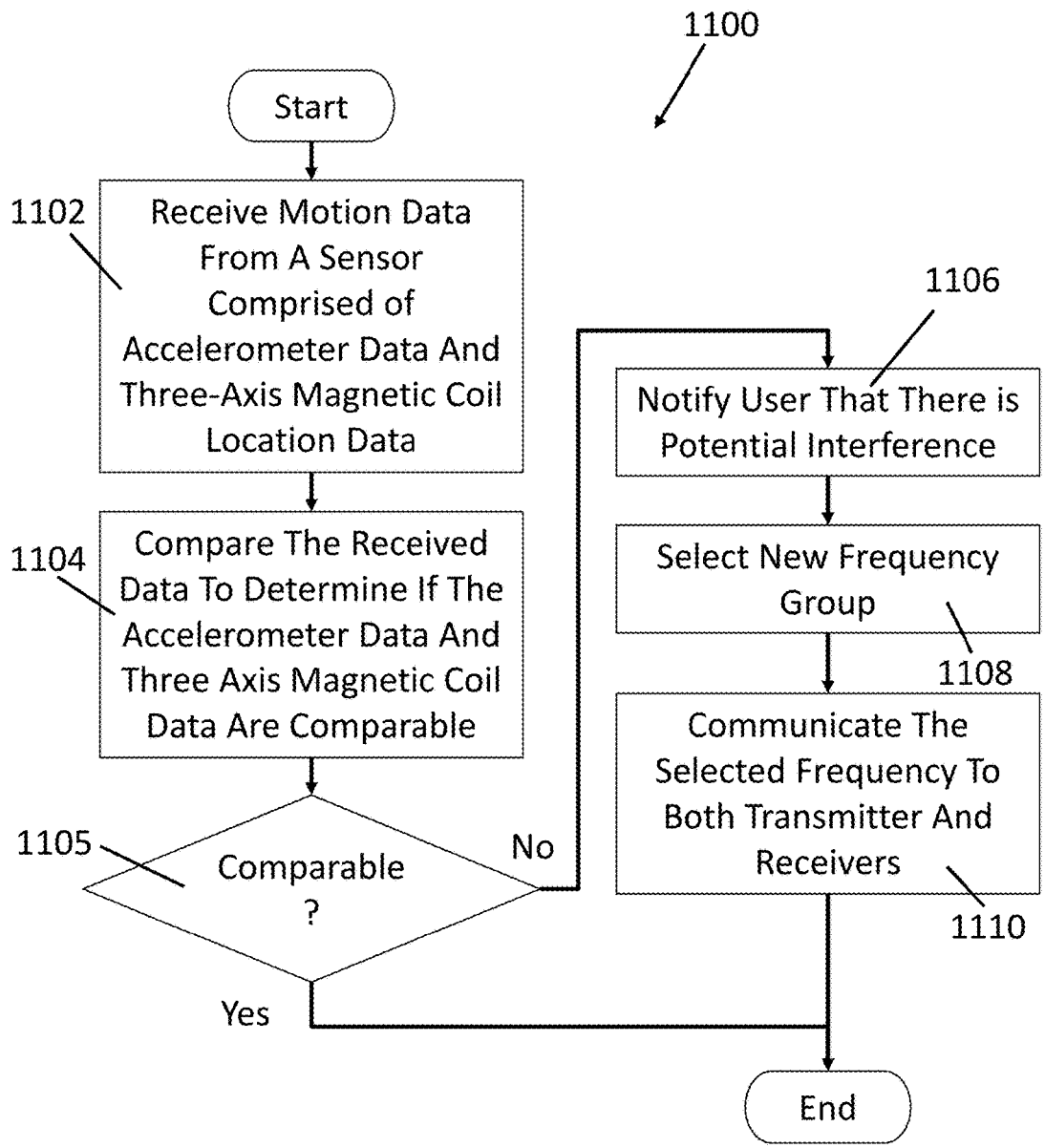
FIG. 11 is a flowchart illustrating the steps to automatically detect sensor interference and switch the frequency group used according to an exemplary embodiment.

The flowchart 1100 of FIG. 11 illustrates the steps performed by an exemplary embodiment to detect such errors. In step 1102, the host 202 receives motion data from an accelerometer and three-axis magnetic coil data. In step 1104, this information is compared to determine if the data is compatible with regard to potential movement. If the comparison 1105 indicates that one of the accelerometer or three-axis magnetic coil sensors is detecting an oscillatory motion and the other sensor is not, the user is notified in step 1106. A new frequency group is selected in step 1108. This selection may be done by the user as described herein or may be done automatically by the host 202 by selecting an available frequency group. In step 1110, the selected frequency group is then communicated to both the transmitter 206 and sensor 208.1, 208.2, and 208.3 is described herein.

One skilled in the art will appreciate that the described tracking sensors 208.1, 208.2, and 208.3 can be used to similarly track other components involved in welding and other industrial operations outfitted with a sensor, including, for example, equipment, fixtures, jigs, parts, operators, etc.

What is claimed is:

1. A method of tracking a welding operation, said method comprising:
   providing a workpiece;
   providing a multiple frequency electromagnetic transmitter;
   providing a plurality of welding tools, wherein each welding tool is associated with a tracking sensor that includes an electromagnetic receiver;
   determining a set of frequencies for use by the transmitter and the receivers;
   providing the determined set of frequencies to the transmitter and the receivers;
   transmitting signals from the transmitter to each receiver, wherein the transmitter broadcasts signals at frequencies according to the determined set of frequencies;
   receiving signals by each receiver at the determined set of frequencies; and
   determining orientation and position of each receiver based on the received signals.

2. The method of claim 1, further comprising the step of: displaying a representation of each of said plurality of welding tools on a display device, where such representation illustrates the spatial orientation of the welding tools based on the determined orientation and position of the receiver associated with the welding tool.

3. The method of claim 1, wherein the step of determining a set of frequencies for use by the transmitter and receiver comprises the sub steps of:
   presenting a plurality of frequency sets on a user interface, and receiving a selection of one of said plurality of frequency sets.

4. The method of claim 1, wherein the electromagnetic transmitter and receivers each comprise three electromagnetic coils.

5. The method of claim 4, wherein the determined set of frequencies comprises three discrete frequencies and those discrete frequencies are each assigned to an electromagnetic coil in the transmitter and a corresponding coil in the receiver.

6. The method of claim 1, where the welding operation is performed manually.

7. The method of claim 1, further comprising the steps of:
providing a plurality of welding parameters for a welding operation to a data processing component; and
providing the determined orientation and position of each receiver to the data processing component; and
determining, by the data processing component, a correlation between the determined orientation and position of each receiver and the plurality of welding parameters.

8. The method of claim 1, further comprising:
receiving a device identifier that corresponds to a device known to interfere with an electromagnetic tracking system comprised by the transmitter and receivers;
identifying a frequency set that is resistant to interference caused by the identified interfering device;
configuring the transmitter to transmit the identified frequency set; and
configuring the receivers to receive the identified frequency set.

9. The method of claim 8, wherein the device identifier is selected from a list comprised of welding system device identifiers.

10. The method of claim 9, wherein identifying the frequency set that is resistant to interference by the selected device comprises the steps of retrieving a lookup table and locating the device identified by the device identifier and a corresponding frequency set on the retrieved lookup table.

11. The method of claim 8, wherein the step of receiving a device identifier that corresponds to a device known to interfere with the electromagnetic tracking system comprises the sub steps of:
displaying a user interface that includes a listing of devices known to interfere with the electromagnetic tracking system; and
receiving at the user interface, a selection of a device contained in the listing.

12. The method of claim 8, wherein the step of receiving a device identifier that corresponds to a device known to interfere with the electromagnetic tracking system comprises the sub step of receiving the device identifier directly from the device known to interfere with the electromagnetic tracking system.

* * * * *